(12) United States Patent
Cai

(10) Patent No.: US 9,354,710 B2
(45) Date of Patent: May 31, 2016

(54) ELECTRONIC DEVICE

(71) Applicant: Lenovo (Beijing) Co., Ltd., Beijing (CN)

(72) Inventor: Xiao Cai, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/453,188

(22) Filed: Aug. 6, 2014

(65) Prior Publication Data

US 2015/0042560 A1 Feb. 12, 2015

(30) Foreign Application Priority Data

Aug. 9, 2013 (CN) .......................... 2013 1 0346557
Aug. 9, 2013 (CN) .......................... 2013 1 0346586
Aug. 19, 2013 (CN) .......................... 2013 1 0361810

(51) Int. Cl.
*G06F 1/16* (2006.01)
*G06F 3/01* (2006.01)
*G03B 21/14* (2006.01)

(52) U.S. Cl.
CPC .............. *G06F 3/017* (2013.01); *G03B 21/145* (2013.01); *G06F 1/166* (2013.01); *G06F 1/1639* (2013.01)

(58) Field of Classification Search
CPC ....... G06F 3/017; G06F 1/1639; G06F 1/166; G03B 21/145
See application file for complete search history.

(56) References Cited

U.S. PATENT DOCUMENTS

| | | | |
|---|---|---|---|
| 2003/0165048 A1* | 9/2003 | Bamji | G06F 1/1626 361/679.21 |
| 2005/0264460 A1* | 12/2005 | Sunaga | G06K 7/10316 343/702 |
| 2012/0312955 A1* | 12/2012 | Randolph | F16M 11/10 248/688 |
| 2014/0118704 A1* | 5/2014 | Duelli | H04N 9/3173 353/70 |

\* cited by examiner

*Primary Examiner* — Premal Patel
(74) *Attorney, Agent, or Firm* — Harness, Dickey & Pierce, P.L.C.

(57) ABSTRACT

An electronic device is provided in the disclosure. The electronic device includes a body, a display unit, and a projecting unit; where the body comprises a first surface and a second surface which intersects the first surface, where the second surface supports the body in a standing position on a support surface at a first angle which is not zero degrees between the second surface and the support surface; the display unit is disposed on the first surface and displays content; and the projecting unit is supported by the body and projects content externally when the body stands on the support surface.

29 Claims, 14 Drawing Sheets

ELECTRONIC DEVICE

The present application claims the priority to Chinese Patent Application No. 201310346557.6, entitled as "AN ELECTRONIC DEVICE", filed on Aug. 9, 2013 with State Intellectual Property Office of People's Republic of China, which is incorporated herein by reference in its entirety.

The present application claims the priority to Chinese Patent Application No. 201310346586.2, entitled as "AN ELECTRONIC DEVICE", filed on Aug. 9, 2013 with State Intellectual Property Office of People's Republic of China, which is incorporated herein by reference in its entirety.

The present application claims the priority to Chinese Patent Application No. 201310361810.5, entitled as "AN ELECTRONIC DEVICE", filed on Aug. 19, 2013 with State Intellectual Property Office of People's Republic of China, which is incorporated herein by reference in its entirety.

FIELD

The present disclosure relates to the field of electronic technology, and particularly to an electronic device.

BACKGROUND

With the development of the electronic technology, more and more electronic devices enter people's life, bringing convenience to people's life and work. For example, mobile phones and tablets facilitate people to contact anytime and anywhere.

However, for a mobile phone or a tablet, even for a notebook computer, for example, the display relies on just a liquid crystal displayer of its own, the size of which is limited by the size of the mobile phone, the tablet or the notebook computer, resulting in an inconvenience to a user. Furthermore, when a user intends to show contents in an electronic device to other users, other users are required to be around the electronic device to view the contents, which also results in an inconvenience.

In the conventional technology, to solve the above problem, contents in an electronic device are projected on a bearing surface by a projecting unit, such that a user may view or operate with a larger display interface.

However, the inventor finds that a mobile phone with a projective function or a projector, when used, may only perform a projection with a surface opposite to a displayer being placed on a support surface, which limits both a projection angle and a projection bearing surface, thereby limiting the application scenarios of the projecting unit.

Further, in the conventional technology, generally the shape of the handset electronic device such as a mobile phone is with a bar-style model, also some shapes such as a flip-open cover or a sliding cover. Regarding to the electronic device with the bar-style model, the electronic device is an integrated whole, that is, the housing is physically a whole; and regarding to the electronic device with the flip-open cover or the sliding cover, the whole electronic device is physically in two parts, accordingly, the housing is also in two parts.

However, the inventor finds in the conventional technology that, the electronic device with the bar-style model is physically integrated, and with regards to the electronic device with the flip-open cover or the sliding cover, when the position relation between the two parts changes, the appearance of the electronic device may also change in view of appearance. Therefore, the electronic device in the conventional technology has different appearances in the case that the two parts of the electronic device are in different position relations.

SUMMARY

In the present disclosure, an electronic device is provided to solve the problem in the conventional technology.

In one aspect of the disclosure, an electronic device is provided, the electronic device includes:
 a body,
 a display unit, and
 a projecting unit;
 where the body includes a first surface and a second surface which intersects the first surface, wherein the second surface supports the body in a standing position on a support surface at a first angle which is not zero degrees between the second surface and the support surface;
 the display unit is disposed on the first surface and displays content; and
 the projecting unit is supported by the body and projects content externally when the body stands on the support surface.

Optionally, the content displayed on the first surface is different from the content projected externally.

Optionally, the projecting unit projects content externally on a first bearing surface, and the first bearing surface is the support surface.

The body further includes a third surface opposite to the first surface; where
 a first light passway is formed on a first end of the first surface or third surface away from the second surface, and a light path of the projecting unit passes through the first light passway and projects content on the support surface.

Optionally, when an output light direction of the projecting unit is a direction towards a fourth surface opposite to the second surface, the electronic device further includes:
 a first light path changing unit disposed between the projecting unit and the fourth surface, where the position relation between the first light path changing unit and the fourth surface includes a first relative position and a second relative position, and in the case that the first light path changing unit is in the first relative position, the first light path changing unit changes a light path of the projecting unit to a direction towards the fourth surface.

Optionally, a second light passway is formed on the fourth surface, and in the case that the first light path changing unit is in the second relative position, a light path of the projecting unit passes through the second light path and projects content on a surface which is different from the support surface.

Optionally, the body includes a main body and an assistant body, and the electronic device further includes a connecting unit connects the main body with the assistant body;
 the display unit is disposed on the main body; and
 the assistant body includes a fifth surface, the first surface includes the fifth surface and the surface on which the display unit is located, and the first light passway is formed on the fifth surface.

Optionally, the assistant body further includes a fourth surface opposite to the second surface, and a position of the fourth surface and a position of the fifth surface are interchanged after the assistant body is rotated with respect to the center of the connecting unit by a predetermined angle.

Optionally, the assistant body is detachably connected to the main body by the connecting unit.

Optionally, the electronic device further includes:

a bracket, disposed on a third surface opposite to the first surface which supports, together with the second surface, the body to stand on the support surface.

Optionally, a recess is formed on the third surface, in which the bracket is held.

Optionally, the assistant body is a triangular prism.

Optionally, the body includes a main body and an assistant body, the electronic device further includes a connecting unit; and the assistant body is coupled to the main body by the connecting unit;

where a fifth surface of the assistant body and the first surface is in a first position relation or a second position relation different from the first position relation, the main body and the assistant body have a first appearance in the case of the first position relation, and the main body and the assistant body have a second appearance substantially the same as the first appearance in the case of the second position relation.

Optionally, the electronic device has a first operating mode and a second operating mode different from the first operating mode, the electronic device is in the first operating mode in the case that the fifth surface and the first surface is in the first position relation, and the electronic device is in the second operating mode in the case that the fifth surface and the first surface is in the second position relation.

Optionally, the projection unit disposed on the main body or the assistant body, the first operating mode is a first projection mode and the second operating mode is a second projection mode, the first projection mode being different from the second projection mode.

Optionally, the first position relation is a position relation that the fifth surface and the first surface are on the same side of the electronic device, or a position relation that a fourth surface of the assistant body is opposite to the first surface; and the second position relation is a position relation that a third angle formed between the fifth surface and the first surface is not of zero degrees.

Optionally, the third surface is opposite to the first surface, the second surface intersects with the third surface;

in the case that the electronic device is in the first projection mode, the electronic device stands on a supporting surface via the second surface, a first angle is formed between the first surface and the supporting surface, the first angle is not of zero degrees; and the projection unit projects a second display content on a first bearing surface; and in the case that the electronic device is in the second projection mode, the electronic device stands on the supporting surface via the third surface, the projection unit projects a third display content on a second bearing surface.

Optionally, the fifth surface has a first light passway, the projection unit projects the second display content on the first bearing surface via the first light passway in the case of the first projection mode, and the projection unit projects the third display content on the second bearing surface via the first light passway in the case of the second projection mode.

Optionally, in the case that the projection unit is disposed in the main body and the direction of output light for the projection unit is toward the fourth surface, the assistant body further includes:

an first light path changing unit, which changes, in the case of the first projection mode, the light path of the projection unit to make the light path pass the first light passway on the fifth surface which is in the first position relation.

Optionally, the assistant body is rotatably connected to the main body by the connecting unit, the connecting unit being disposed at the central position of the sixth surface and the seventh surface.

Optionally, in the case that the fifth surface and the first surface is in the first position relation, the fifth surface and the first surface is in the second position relation after the assistant body is rotated by 180 degrees with respect to the central position by means of the connecting unit.

Optionally, the display unit includes a first edge and a second edge which corresponds to the first edge and which is parallel to the first edge; and the projection unit, supporting a first projection mode and a second projection mode; where, in the case that the projection unit projects in the first projection mode, a content to be projected is projected into a first projection region corresponding to the projection unit, and a first display interface corresponding to the content to be projected is formed on a first bearing surface of the first projection region, with the first display interface being located on a first side corresponding to the first edge of the display unit;

in the case that the projection unit projects in the second projection mode, the content to be projected is projected into a second projection region corresponding to the projection unit, and a second display interface corresponding to the content to be projected is formed on a second bearing surface of the second projection region, with the second display interface being located on a second side corresponding to the second edge of the display unit.

Optionally, the body includes a main body and an assistant body, and the electronic device further includes a connecting unit; the main body and the assistant body are rotatably connected by the connecting unit, where, in the case that the main body and the assistant body are at a first relative position, the projection unit projects in the first projection mode; and in the case that the main body and the assistant body are at a second relative position differing from the first relative position, the projection unit projects in the second projection mode.

Optionally, the assistant body includes:

a first light path changing unit, which changes a projective light path of the projection unit between the first projection mode and the second projection mode.

The electronic device further includes:

a first light path changing unit, arranged in the body and which alternatively changes a projective light path of the projection unit between the first projection mode and the second projection mode.

Optionally, the body further includes a third surface, the second surface intersects with the third surface, and the third surface is opposite to the first surface, in the case that the body stands on a supporting surface via the third surface, the first light path changing unit is in a first status and the projection unit projects in the first projection mode; and in the case that the body stands on the supporting surface via the second surface, the first light path changing unit is in a second status and the projection unit projects in the second projection mode.

Optionally, the electronic device further includes:

a controlling unit, arranged in the body and controls, based on a triggering condition, the projection unit to switch between the first projection mode and the second projection mode.

Optionally, the body further includes a third surface, the second surface intersects with the third surface, the third surface is opposite to the first surface, and the electronic device further includes:

a detection unit, which detects whether the body stands on a supporting surface via the third surface or the second surface;

where the controlling unit switches the projection unit to project in the first projection mode based on the triggering condition that the body stands on the supporting surface via the third surface, or switch the projection unit to project in the second projection mode based on the triggering condition that the body stands on the supporting surface via the second surface.

Optionally, the electronic device further includes:

a gesture detection unit, which detects whether there is a gesture input when the projection unit projects in any one of the first projection mode and the second projection mode or only in the second mode; and a first processing unit, arranged in the body, which performs an operation corresponding to the gesture input in response to the gesture input if there is the gesture input.

Optionally, the first processing unit, in response to the gesture input, performs the operation corresponding to the gesture input for the content to be projected.

BRIEF DESCRIPTION OF THE DRAWINGS

For more clearly illustrating embodiments or the technical solution in the conventional technology, drawings referred to describe the embodiments or the conventional technology will be briefly described hereinafter. Apparently, the drawings in the following description are only several embodiments of the present invention, and for the person skilled in the art other drawings may be obtained based on these drawings without any creative efforts.

DETAILED DESCRIPTION

In the present disclosure, an electronic device is provided to solve the problem in the conventional technology that both a projection angle and a projection bearing surface are limited because a projection may only be performed at a surface opposite to a displayer being placed on a support surface when a projector is used.

An electronic device is provided in the disclosure. The electronic device includes a body, a display unit, and a projecting unit; where the body comprises a first surface and a second surface which intersects the first surface, where the second surface supports the body in a standing position on a support surface at a first angle which is not zero degrees between the second surface and the support surface; the display unit is disposed on the first surface and displays content; and the projecting unit is supported by the body and projects content externally when the body stands on the support surface.

In one embodiment, the content displayed on the first surface may be a first display content, and the content projected externally may be a second display content.

An electronic device is provided in the disclosure. The electronic device includes: a body, a display unit and a projecting unit. The body of the electronic device includes a first surface and a second surface which intersects the first surface, where the second surface supports the body in a standing position on a support surface at a first angle which is not zero degrees between the second surface and the support surface. The display unit is disposed on the first surface and displays a first display content. The projecting unit is disposed on the body and projects a second display content on a first bearing surface when the body stands on the support surface. As can be seen, when the electronic device in the embodiment is used, the second surface, intersecting with the first surface on which the display unit is located, contacts with the support surface, thus the electronic device may stand on the support surface. The electronic device performs a projection in a posture similar to "standing" on the support surface, thus the electronic device may stands to project, solving the problem in the conventional technology that both a projection angle and a projection bearing surface are limited because a projection may only be performed at a surface opposite to a displayer being placed on a support surface when a projector is used.

To provide a better understanding of the above technique solution, the technique solution will be described in detail in conjunction with the accompanying drawings and specific embodiments.

Figure 1:
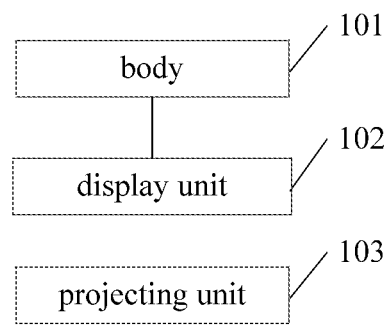
FIG. 1 is a functional block diagram of an electronic device according to an embodiment of the disclosure.
Figure 2:
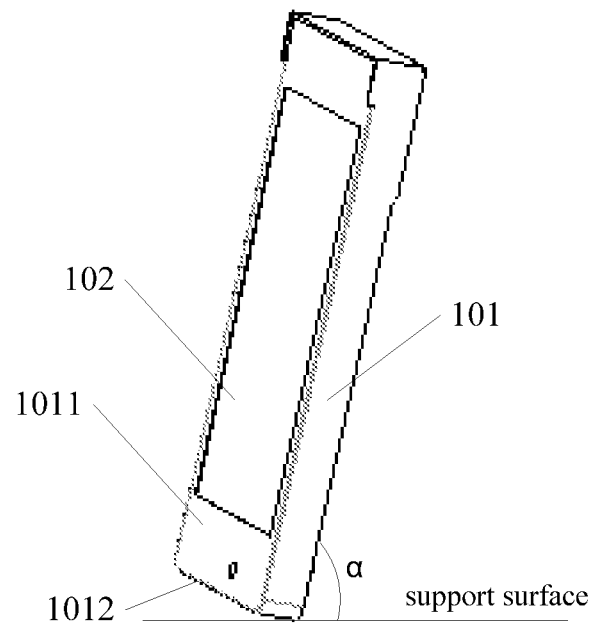
FIG. 2 is a structural diagram of an electronic device according to an embodiment of the disclosure.

Referring to FIGS. 1-3, an electronic device is provided in an embodiment of the disclosure. FIG. 1 is a functional block diagram of the electronic device in the embodiment and FIG. 2 is a structural diagram of the electronic device in the embodiment.

As shown in FIG. 1 and FIG. 2, the electronic device includes: a body 101, a display unit 102 and a projecting unit 103. The body 101 includes a first surface 1011 and a second surface 1012 which intersects the first surface, where the second surface 1012 supports the body 101 in a standing position on a support surface at a first angle α which is not zero degrees between the second surface 1012 and the support surface. The display unit 102 is disposed on the first surface 1011 and displays a first display content. The projecting unit 103 is disposed on the body 101 and projects a second display content on a first bearing surface when the body 101 stands on the support surface.

As can be seen from FIG. 3, when body 101 stands on the support surface, the projecting unit 103 may perform a projection in different directions with different angles depending on different locations of the projecting unit 103 on the body 101 and different surfaces of the projecting unit 103 for outputting lights. These will be described from different points of view.

From a first point of view, two situations depending on whether the projecting unit 103 is fixed or not will be described as follows.

In a first situation, the projecting unit 103 is fixed. There are also multiple embodiments in this case, a few of which will be listed below, the disclosure is not limited thereto.

Figure 3A:
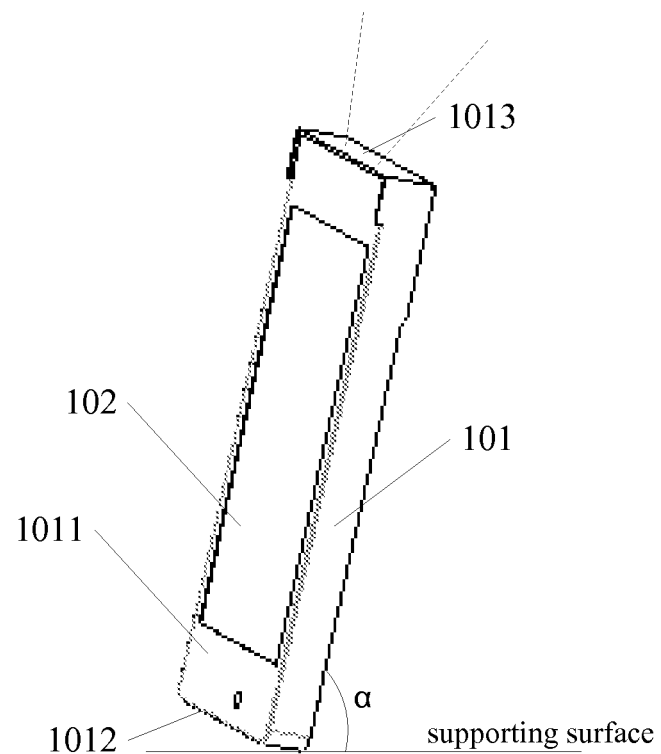
FIG. 3a to FIG. 3b are schematic diagrams of a projection by an electronic device according to an embodiment of the disclosure.

In a first embodiment, the projecting unit 103 is fixed in the body 101, and the output light direction of the projecting unit 103 is towards a fourth surface 1013 opposite to the second surface 1012. In this case, a light path of the projecting unit 103 passes through a second light passway on the fourth surface 1013 and projects the second display content to the first bearing surface, such as a ceiling, as shown in FIG. 3a.

Figure 3B:
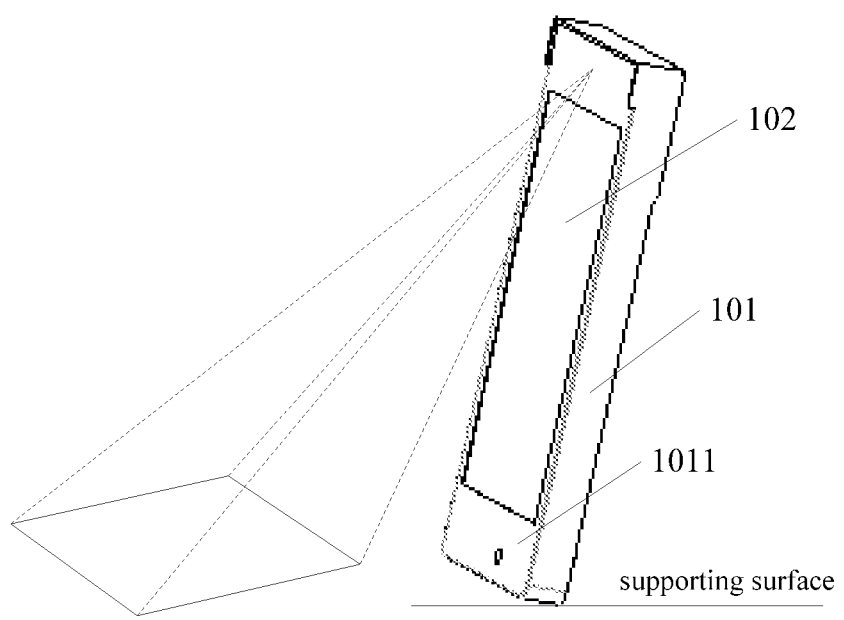

In a second embodiment, the body further includes a third surface opposite to the first surface 1011. A first light passway is formed on a first end of the first surface 1011 or the third surface away from the second surface 1012, and a light path of the projecting unit 103 passes through the first light passway and projects the second display content on the support surface. As shown in FIG. 3b, the projecting unit 103 is fixed in the body 101, and a light path of the projecting unit 103 passes through the first light passway on the first surface 1011 or the third surface, and projects the second display content on the support surface.

In the third embodiment, the projecting unit 103 is fixed in the body 101, and the output light direction of the projecting unit 103 is towards a fourth surface 1013 opposite to the second surface 1012. The second display content needs to be projected on the support surface via the first light passway. Thus in this embodiment, the electronic device further includes a first light path changing unit disposed between the projecting unit 103 and the fourth surface 1013. The position relation between the first light path changing unit and the fourth surface 1013 includes a first relative position and a second relative position. When the first light path changing unit is in the first relative position, the first light path changing unit changes a light path of the projecting unit 103, to make the light path to pass through the first light passway.

In an embodiment, the first light path changing unit includes a reflector and a rotator. The reflector and the rotator are connected to each other. In practice, the rotator may protrude out of the body, such that a user may rotate the rotator to adjust an reflection angle of the reflector or a location of the reflector; alternatively, the electronic device may further include a motor which controls, according to an instruction of the electronic device, a rotation of the rotator to drive the reflector to rotate, thus a reflection angle of the reflector or a location of the reflector is adjusted. Clearly, in another embodiment, the first light path changing unit may be implemented in another way, as long as a light path of the projecting unit 103 may be changed from towards the fourth surface 1013 to towards the first light passway.

In a fourth embodiment, a second light passway is formed on the fourth surface 1013 on the basis of the third embodiment. When the first light path changing unit is at the second relative position, a light path of the projecting unit 103 passes through the second light passway and projects a third display content on a second bearing surface which is different from the first bearing surface. In this embodiment, under the condition that the projecting unit 103 is fixed, the light path of the projecting unit 103 may be changed by changing the location of the first light path changing unit, thus a projection mode with two different projective directions may be achieved.

In a fifth embodiment, to achieve the solution of the second embodiment, that is, the projecting unit 103 is fixed in the body 101, and the output light direction of the projecting unit 103 is towards a fourth surface 1013 opposite to the second surface 1012, while the second display content needs to be projected on the support surface through the first light passway, the electronic device may, similar to the third embodiment, further include a first light path changing unit disposed between the projecting unit 103 and the fourth surface 1013. This embodiment differs from the third embodiment in that the location of the first light path changing unit is also fixed without changing. Then a light path of the projecting unit 103 is changed by the first light path changing unit to project the second display content through the first light passway.

Figure 4A:
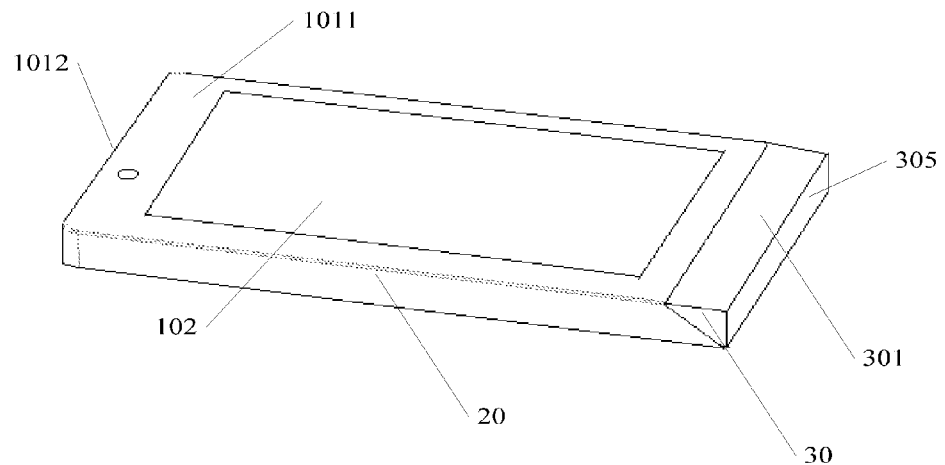
FIG. 4a to FIG. 4b are structural diagrams of an electronic device according to another embodiment of the disclosure.
Figure 4B:
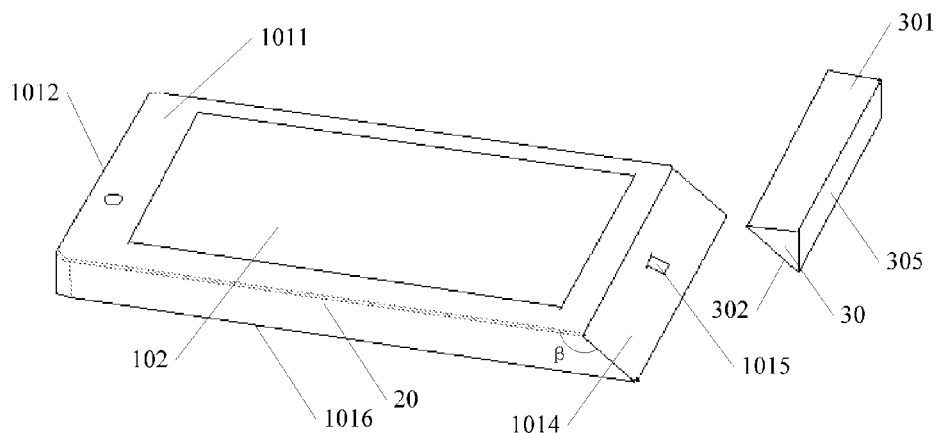

In a sixth embodiment, as shown in FIG. 4a and FIG. 4b, the body 101 includes a main body 20 and an assistant body 30, and the electronic device further includes a connecting unit which connects the main body 20 with the assistant body 30. The display unit 102 is disposed on the main body 20. The assistant body 30 includes a fifth surface 301, the first surface 1011 includes the fifth surface 301 and the surface on which the display unit 102 is located, and the first light passway is formed on the fifth surface 301. In one embodiment, the assistant body may be a triangular prism.

Another structure of the electronic device in this embodiment is as shown in FIG. 4b. The body 20 in FIG. 4b further includes a sixth surface 1014 connected to both the first surface 1011 and the third surface, and a second angle 13, which is an obtuse angle, is formed between the sixth surface 1014 and the first surface 1011; and the assistant body 30 includes a seventh surface 302 corresponding to the sixth surface 1014, and the connecting unit connects the sixth surface 1014 with the seventh surface 302.

Figure 5:
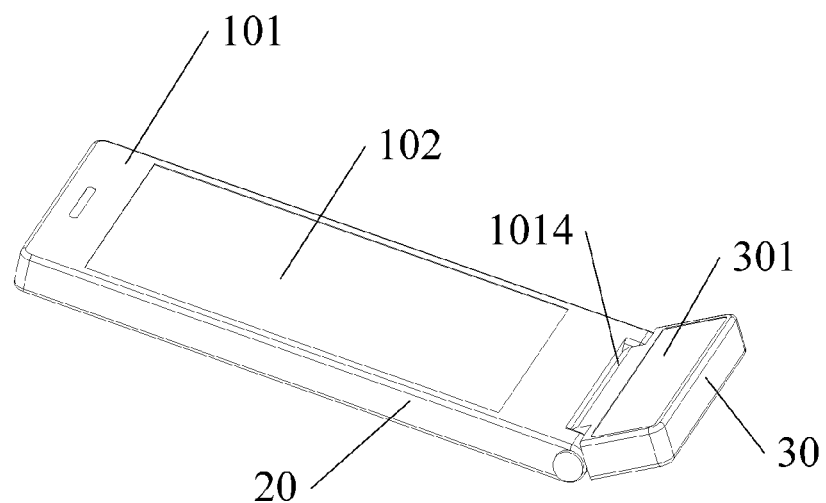
FIG. 5 is a structural diagram of an electronic device according to yet another embodiment of the disclosure.

In the structure of FIG. 5, the sixth surface 1014 is nearly perpendicular to the first surface 1011. For example, the angle formed between the sixth surface 1014 and the first surface 1011 is of about 90 degrees, floating up or down in 5 degrees.

Still referring to FIG. 4a, FIG. 4b and FIG. 5, the connection between the assistant body 30 and the main body 20 in this embodiment may be detachable or fixed. The projecting unit 103 is disposed on the assistant body 30, and a light path of the projecting unit 103 passing through the first light passway on the fifth surface 301 and projects the second display content on the support surface.

In an embodiment, the assistant body 30 is detachably connected to the main body 20 by a connecting unit. The connecting unit may be, for example, a structure of a hook and a slot, which are disposed respectively on the assistant body 30 and the main body 20. Clearly, in practice, the connecting unit may be other detachable structures.

Further, the solution of this embodiment may be combined with the first, the third to the fifth embodiment.

In a seventh embodiment, the difference from the sixth embodiment is that the projecting unit 30 is disposed on the main body 20, and the assistant body 30 may be rotatably connected to the main body 20 by a connecting unit, as shown in FIG. 5.

Figure 6:
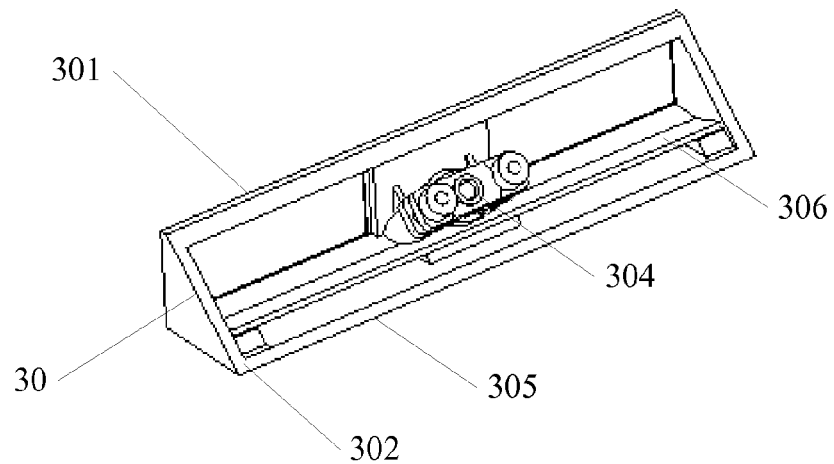
FIG. 6 is a structural diagram of an assistant body according to an embodiment of the disclosure.

In an embodiment, the assistant body 30 may be rotatably connected to the main body 20 by a connecting unit. The connecting unit may be, for example, a hinge structure (as shown in FIG. 5), or a central shaft (as shown in FIG. 6), or other rotatable structures. Further, the connecting unit may support rotating to and keeping at multiple angles.

In another embodiment, the assistant body 30 may be rotatably and detachably connected to the main body 20 by a connecting unit. That is, the assistant body 30 may be separated from the main body 20 and also may be rotated relative to the main body 20 when the assistant body 30 is connected to the main body 20.

Referring to FIG. 4*b* and FIG. 6, a first opening 1015 is further provided on the sixth surface 1014. The location of the opening 1015 corresponds to the location of the projecting unit 103, a light path of the projecting unit 103 may pass through the first opening 1015. Further, the assistant body 30 further includes a fourth surface 305 opposite to the second surface 1012. After the assistant body 30 is rotated with respect to the center of the connecting unit 304 by a predetermined angle, a position of the fourth surface 305 and a position of the fifth surface 301 are interchanged. The connecting unit 304 may be, for example, a shaft disposed at the center of the seventh surface 302 and the center of the sixth surface 1014.

Further, the first opening 1015 is also located at the center of the sixth surface 1014. A light path of the projecting unit 103 passes through the first opening 1015 and then passes through the connecting unit.

When the fifth surface 301 is rotated to the position of the fourth surface 305, that is, when the fifth surface 301 is opposite to the second surface 1012, the light path of the projecting unit 103 is not changed, which passes through the first light passway on the fifth surface 301 and projects the third display content on the second bearing surface, the second bearing surface is different from the first bearing surface.

As shown in FIG. 6, the assistant body 30 further includes a first light path changing unit 306. When the fifth surface 301 is rotated to the position in FIG. 4*a*, that is, when the fourth surface 305 is opposite to the second surface 1012, the first light path changing unit 306 changes the light path of the projecting unit 103, such that the light path passes through the first light passway on the fifth surface 301. The first light path changing unit 306 may be, for example, a reflector.

In this embodiment, the projecting unit 103 is disposed in the main body 20. It is possible to project in two different directions with two different angles at the same posture by just rotating the assistant body 30 without changing the position of the main body 20. Therefore, the assistant body 30 is smaller in size and does not need complicated wirings and electrical connections.

In the above sixth and seventh embodiment, the specific structure of the connecting unit is well known by those skilled in the art, who may choose a suitable connection structure according to actual requirements. Thus, it will not be described herein.

In a second situation, the projecting unit 103 is rotatable per se. In this case, there are also multiple embodiments, such as an eighth embodiment. In the eighth embodiment, the structure is as shown in FIG. 5, for example. That is, the assistant body 30 is rotatably connected to the main body 20 by a connecting unit, and the projecting unit 103 is disposed in the assistant body 30. Thus, it is possible to project in different directions with different angles by rotating the assistant body 30 to rotate the projecting unit 103.

From a second point of view, that is, from the point of view of the electronic device's appearance, the outlook may be either integrated or separated into two parts. Specifically, the first to fifth embodiments, for example, may be referred to for the integrated appearance, and the sixth, the seventh, and the eight embodiments may be referred to for the separated appearance.

From a third point of view, the bearing surface may be the support surface or other surface. In a first situation, the bearing surface is the support surface. That is, when standing on the support surface, the electronic device may project the second display content on the support surface, as shown in FIG. 3*b*. By this way, it may be convenient for a user to view the display content on the support surface. And when the display content is projected on the support surface from the third surface, it is possible to show the content to another user while the user himself may view the content on the display unit at the same time. Thus, it is possible to apply the electronic device to more scenarios.

In a second situation, the bearing surface may be other bearing surface, such as the case in the first or the fourth embodiment, which will not be repeated herein.

Next, specifics about how the body 101 stands on the support surface will be described.

When stands on the support surface, the body 101 contacts the support surface via the second surface 1012. The second surface 1012, which may be a plane surface or a curved surface, intersects with the first surface 1011.

For example, the case that the second surface 1012 is a plane surface is firstly described. As shown in FIG. 4*a*, in the case that the second surface 1012 is a plane surface, a fourth angle formed between the first surface 1011 and the second surface 1012 may be equal to, more than, or less than 90 degrees.

Figure 7A:
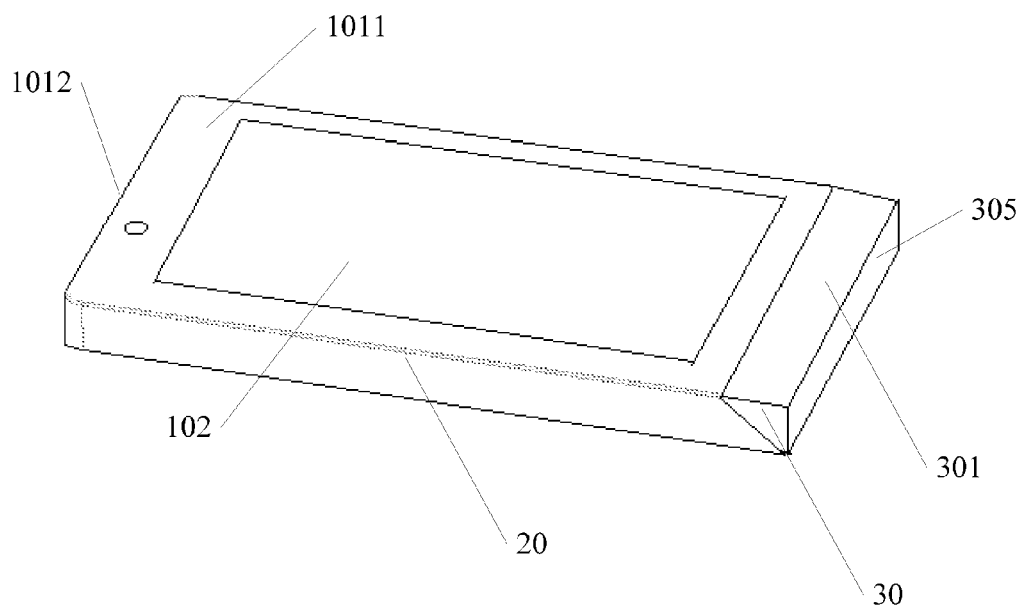
FIG. 7a to FIG. 7b are schematic diagrams of shapes of a second surface according to an embodiment of the disclosure.

Then, the case that the second surface 1012 is a curved surface is described. As shown in FIG. 7*a*, for example, the second surface 1012 is a curved surface, and the arc of the curved surface is towards the display unit 102. The body 101 stands on the support surface via the intersecting section of the second surface 1012 and the first surface 1011.

Figure 7B:
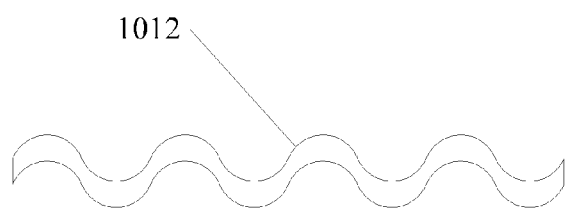

Referring to FIG. 7*b*, a wave-shaped surface is shown, as a case that the second surface 1012 is a curved surface. In practice, the second surface 1012 may be a sawtooth-shaped surface, or may be a surface having a wave-shaped, sawtooth-shaped or other-shaped unevenness on a plane basis, i.e., one part of the second surface 1012 is plane while the other part is curved. Similarly, in the case that the second surface 1012 is a curved surface, a fourth angle formed between the first surface 1011 and the second surface 1012 may be equal to, more than, or less than 90 degrees. In this case, the fourth angle formed between the first surface 1011 and the second surface 1012 may be the angle formed between the central plane of the second surface 1012 and the first surface 1011.

Next, the first angle α will be described in detail. The first angle α may be equal to, more than, or less than 90 degrees, but not equal to zero. Preferably, the first angle α is of 90 degrees, by which the body 101 stands vertically on the support surface. In this case, the projection angle for projecting the second display content on the support surface is better for a user to view.

Preferably, to facilitate the body 101 standing stably on the support surface, the center of gravity of the electronic device is disposed between the second surface 1012 and a central plane of the electronic device. Further, the body 101 is more stable if the center of gravity of the electronic device is closer to the second surface 1012.

Figure 8A:
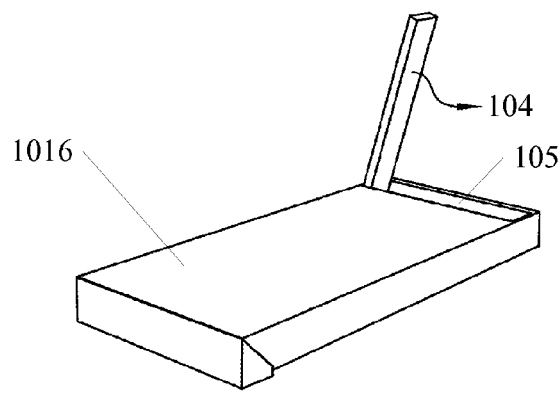
FIG. 8a to FIG. 8b are structural diagrams of a bracket according to an embodiment of the disclosure.
Figure 8B:
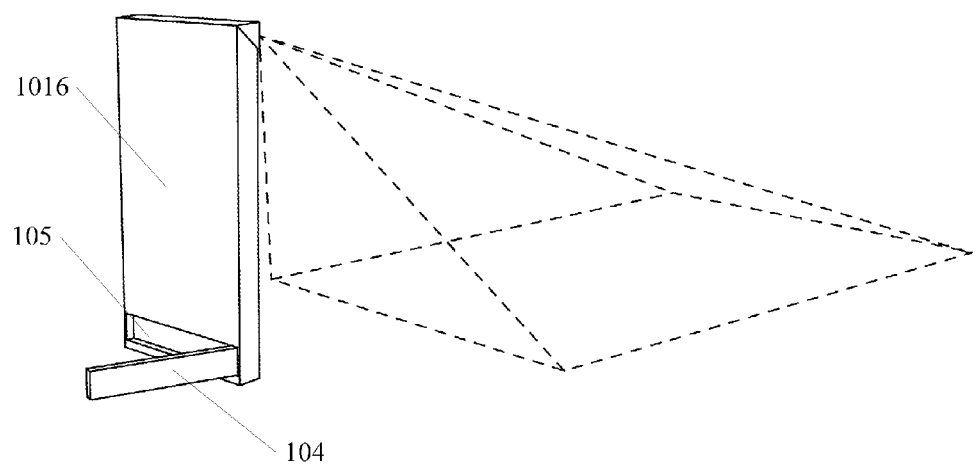

In a further embodiment, to ensure the body 101 stands on the support surface more stably, the electronic device further includes a bracket 104 disposed on a third surface 1016 opposite to the first surface 1011 which supports, together with the second surface 1012, the body 101 to stand on the support surface, as shown in FIG. 8a and FIG. 8b.

In practice, the structure of the bracket 104, as well as the connection of bracket 104 to the body 101, may be implemented in various ways, which are well known by those skilled in the art. The bracket 104 and the connection of bracket 104 to the body 101 in the embodiment will be described as follows.

A recess 105 may be formed on the third surface 1016, for example, and one end of the bracket 104 may be connected to one side of the recess 105 by either a shaft or a spring piece. When the bracket 104 is not used, the bracket 104 may be held in the recess 105. Preferably, the shape of the bracket 104 fits to the shape of the recess 105, thus the third surface 1016 is looked as a plane in appearance when the bracket 104 is held in the recess 105. When the bracket 104 needs to be used, the bracket 104 may be rotated out of the recess 105 by operating the other end of the bracket 104, so that the bracket 104 may support the electronic device together with the second surface 1012. As can be seen, such structure makes the appearance of the electronic device better, and is simple to support the electronic device without an additional bracket.

Next, the relation between the first display content and the second display content will be described.

In practice, the first display content and the second display content may be either the same or different. Specifically, in a first situation, the first display content is the same as the second display content, i.e., the two content are exactly the same. For example, each of them is the desktop of the electronic device, which means the same content is displayed by the display unit 102 and the projecting unit 103, respectively.

In a second situation, the first display content is different from the second display content, which may be further divided into two cases. In a first case, they are totally different, i.e., the two contents are not related. For example, a game screen is displayed on the display unit 102, by which a first user plays a game, while the second display content projected by the projecting unit 103 may be, for example, a movie screen, by which a second user sees a movie.

In a second case, the two contents are not completely the same. For example, two windows are displayed on the display unit 102, one is a window for a document in PowerPoint, and the other one is a window for a video player. But the user only intends to show the window for the document in PowerPoint to another user. At this time, it is possible to project, by the projecting unit 103, only the window for the document in PowerPoint on the first bearing surface for the other users to view conveniently, in which the first bearing surface may be, for example, the support surface.

As can be seen, there are various patterns for projection to be applied to more scenarios.

In the above embodiments, the electronic device may be a smart phone, a PDA, a tablet, or other electronic devices that can be hand-held.

In an embodiment of the present disclosure, an electronic device includes: a body, a display unit and a projecting unit. The body includes a first surface and a second surface which intersects the first surface, wherein the second surface supports the body in a standing position on a support surface at a first angle which is not zero degrees between the second surface and the support surface. The display unit is disposed on the first surface and displays a first display content. The projecting unit is disposed on the body and projects a second display content on a first bearing surface when the body stands on the support surface. As can be seen, when the electronic device in the embodiment is used, the second surface, intersecting with the first surface on which the display unit is located, contacts with the support surface, thus the electronic device may stand on the support surface. The electronic device performs a projection in a posture similar to "standing" on the support surface, thus the electronic device may stands to project is provide in the embodiment, solving the problem in the conventional technology that both a projection angle and a projection bearing surface are limited because a projection may only be performed at a surface opposite to a displayer being placed on a support surface when a projector is used.

In a further embodiment of the disclosure, the first bearing surface is the support surface. That is, the electronic device stands on the support surface and projects the second content on the support surface. For example, the electronic device stands on a desk, and project the second content on the desk by the projecting unit. Thus, a user may view the display content on the desk conveniently, which conforms to user's custom and provides a better user experience.

In a further embodiment of the disclosure, the first display content displayed on the display unit may be different from the second display content projected on the first bearing surface. For example, a video player interface is displayed on the display unit while the second display content may be, for example, a document in WORD to be viewed by a different user at the same time. Thereby the electronic device may be applied to more scenarios.

The electronic device may include: a main body; a display unit, a connecting unit and an assistant body. The display unit is disposed on a first surface of the main body and displays a first display content. The assistant body may be connected to the main body via the connecting unit. When the assistant body is connected to the main body, the position relation between the fifth surface of the assistant body and the first surface may be a first position relation or a second position relation different from the first position relation. The main body and the assistant body present a first appearance in the first position relation, and the main body and the assistant body present a second appearance almost the same as the first appearance in the second position relation. In this embodiment, when the two parts of the electronic device are in connection state, the appearances are substantially the same in two different position relations, so it may be ensured that the appearances are united and integrated in different position relations for the two parts of the electronic device.

In order to better understand the above-mentioned technical solutions, in the following, the above-mentioned technical solutions will be illustrated in detail in conjunction with the accompanying drawings and embodiments.

Figure 9:
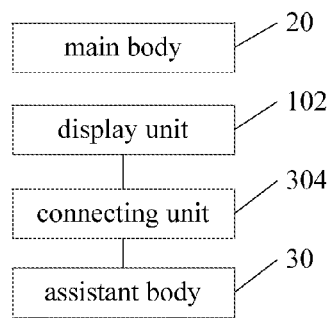
FIG. 9 is a functional block diagram of the electronic device according to an embodiment of the present application.

Referring to FIG. 9 and FIG. 4b, an electronic device is provided according to an embodiment of the present application. FIG. 9 is a functional block diagram of the electronic device according to this embodiment, and FIG. 4b is a structural diagram of the electronic device according to this embodiment.

As shown in FIG. 9 and FIG. 4b, the electronic device includes: a main body 20; a display unit 102, a connecting unit 304 and an assistant body 30. The display unit 102 is disposed on a first surface 1011 of the main body 20 and displays a first display content. The assistant body 30 may be connected to the main body 20 by the connecting unit 304.

When the assistant body 30 is connected to the main body 20, the position relation between a fifth surface 301 of the assistant body 30 and the first surface 1011 is a first position relation or a second position relation different from the first position relation. The main body 20 and the assistant body 30 present a first appearance in the first position relation, and the main body 20 and the assistant body 30 present a second appearance substantially the same as the first appearance in the second position relation.

In an embodiment, the assistant body 30 may be rotatablely connected to the main body 20 by the connecting unit 304. The connecting unit 304 is, for example, a rotation shaft structure, or other rotatable structures.

In another embodiment, the assistant body 30 may be detachably connected to the main body 20 by the connecting unit 304. The connecting unit 304 is, for example, a structure with a hook and a slot respectively disposed on the assistant body 30 and the main body 20. Certainly, in practice, the connecting unit 304 may also be other detachable structures.

Reference is made to FIG. 4b continuingly, which is an exemplary schematic structural diagram of the electronic device according to this embodiment. As shown in FIG. 4b, the electronic device further has a second surface 1012, a third surface 1016 and a sixth surface 1014, the third surface 1016 is opposite to the first surface 1011, the second surface 1012 intersects with the first surface 1011 and the third surface 1016, the sixth surface 1014 is connected to the first surface 1011 and the third surface and is opposite to the second surface 1012, there is a second angle β formed between the sixth surface 1014 and the first surface 1011, and the second angle β is an obtuse angle or an acute angle (the case of the obtuse angle is shown in FIG. 4b, the obtuse angle is taken as an example in subsequent embodiments, and the case of the acute angle is similar as the case of the obtuse). The assistant body 30 further has a seventh surface 302 and a fourth surface 305, the seventh surface 302 corresponds to the sixth surface 1014, the fourth surface 305 is opposite to the second surface 1012, the connecting unit 304 is connected to the sixth surface 1014 and the seventh surface 302.

A first implement state: firstly the case that the assistant body 30 is rotatably connected to the main body 20 by the connecting unit 304 is described. The connecting unit 304 is disposed at the central position of the sixth surface 1014 and the seventh surface 302. In the case that the fifth surface 301 and the first surface 1011 is in the first position relation, after the assistant body 30 is rotated by 180 degrees with respect to the central position by the connecting unit 304, the fifth surface 301 and the first surface 1011 is in the second position relation.

Specifically, as shown in FIG. 4a, the fifth surface 301 and the first surface 1011 are on the same side of the electronic device. In this case, the fifth surface 301 and the first surface 1011 is in the first position relation. Preferably, in this embodiment, the fifth surface 301 and the first surface 1011 is on the same plane in the first position relation. In the case that the second angle β is an acute angle, the first position relation may be specifically that the fourth surface 305 and the first surface 1011 are on two sides of the electronic device. Preferably, the fourth surface 305 and the third surface 1016 is on the same plane in the case of the first position relation.

Figure 10:
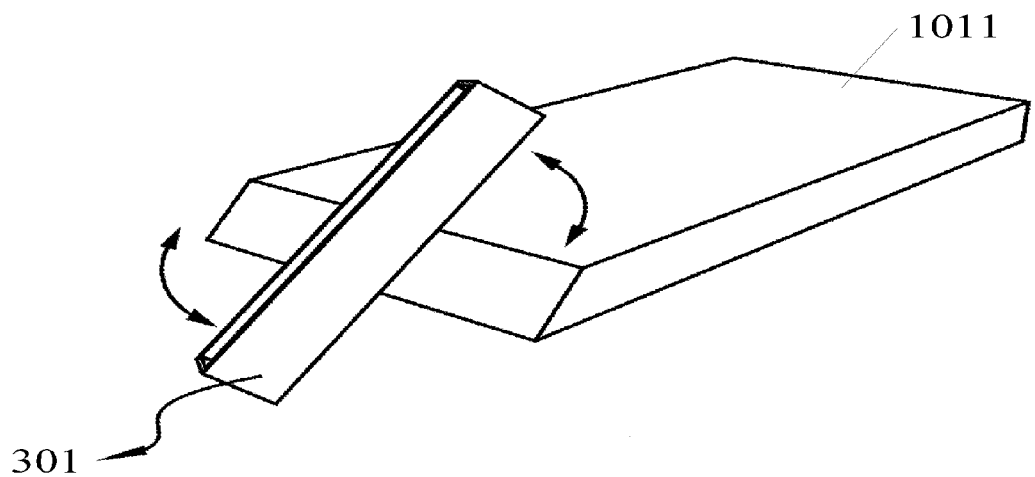
FIGS. 10 and 11 are schematic views of the position relation change according to an embodiment of the present application.
Figure 11:
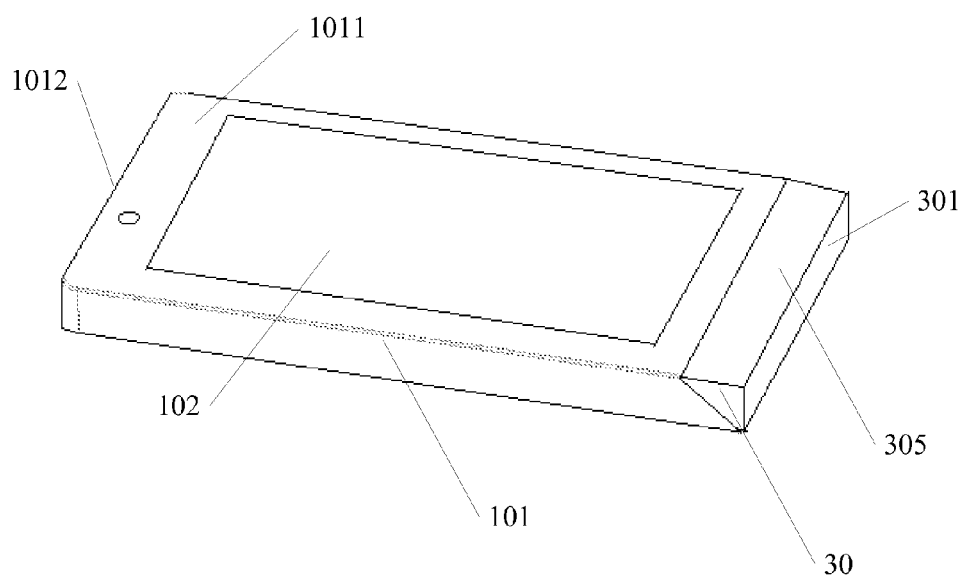

When the assistant body 30 is rotated around the connecting unit 304, reference is made to FIG. 10, which is a state after the assistant body 30 in the state of FIG. 4a is rotated clockwise by 90 degrees. Then the assistant body 30 is rotated continuingly, the state is presented in FIG. 11 after the assistant body 30 is rotated by 180 degrees. In FIG. 11, there is a third angle formed between the fifth surface 301 and the first surface 1011 and the third angle is not of zero degrees, that is, the fifth surface 301 is opposite to the second surface 1012, which is taken as the second position relation. The fourth surface 305 and the first surface 1011 are on the same side of the electronic device (the second angle is an obtuse angle), or the fifth surface 301 and the third surface 1016 are on the same side of the electronic device (the second angle is an acute angle).

FIG. 4a and FIG. 11 may show that, the first appearance in the first position relation is substantially the same as the second appearance in the second position relation, the appearances of the electronic device is ensured united and integrated. Herein, the said "substantially the same" and "the same" are for the whole appearance of the electronic device. For example, two appearances shown in FIG. 4a and FIG. 11 are both substantially cuboids (may be processed to cuboids with fillets to make them beautiful). In the case of other structures, for example, the assistant body 30 is a cylinder with a tangent plane, the tangent plane is a seventh surface 302, or the assistant body 30 may also be a quadripod with a eighth surface, for example, the eighth surface is located between the fifth surface 301 and the fourth surface 305. In this case, the electronic device is kept being bar-style model for both the first appearance and the second appearance. And for "substantially", on one hand, the first appearance and the second appearance are slightly different due to the difference in technology. For example, there may be an error in the mounted position of the connecting unit 304. For another example, there may be an error between connection arcs between the surfaces on the assistant body 30. On the other hand, the "substantially" means that, there may be different structures on the fifth surface 301 or the fourth surface 305, or other surfaces of the assistant body 30. For example, there is a hole on the fifth surface 301, and the fourth surface 305 is a wavy convex.

Figure 12:
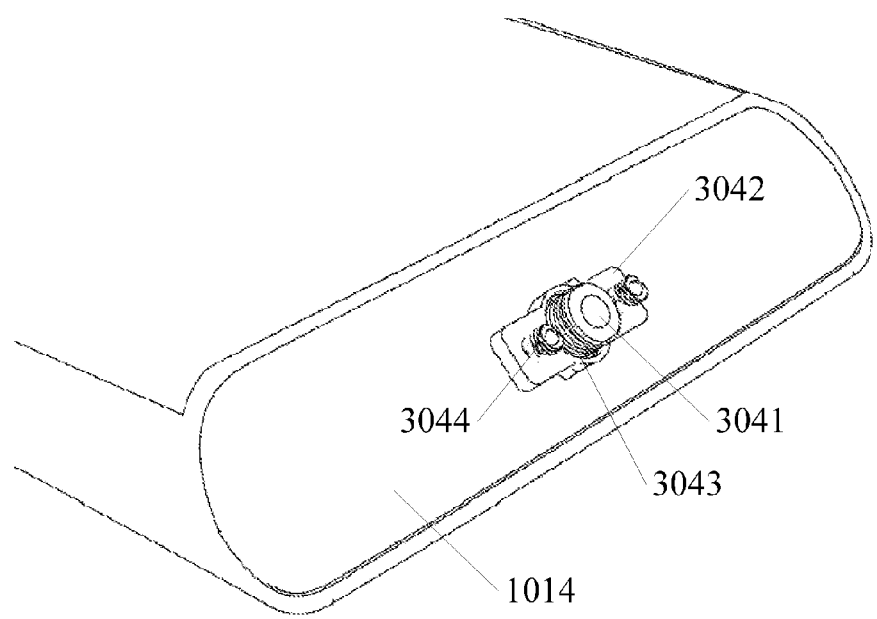
FIG. 12 is a structural view of the connection structure according to an embodiment of the present application.

Furthermore, reference is made to FIG. 12, which is an exemplary schematic structural diagram of the connecting unit 304. As shown in FIG. 12, the connecting unit 304 includes a rotation shaft 3041, one end of which is fixed on the sixth surface 1014. A fastened panel 3042 is sleeved on the rotation shaft 3041 and may be rotatable around the rotation shaft 3041. There is a fastening 3043 on the other end of the rotation shaft 3041, the fastened panel 3042 is fixed between the sixth surface 1014 and the fastening 3043. Furthermore, a connection element 3044 is provided on two ends of the fastened panel 3042, for being connected with the assistant body 30. In the case that the assistant body 30 is connected to the connection element 3044, if an external force is applied on the assistant body 30 to rotate the assistant body 30, the assistant body 30 may drive the fastened panel 3042 to rotate around the rotation shaft 3041.

In other embodiments, the connecting unit 304 may have other structures, as long as it is ensured that the assistant body 30 may be rotated and switched between the first position relation and the second position relation by the connecting unit 304.

A second implement state: in this embodiment, the case that the assistant body 30 is detachably connected to the main body 20 by the connecting unit 304 is described. In this embodiment, the location of the connecting unit 304 is not limited, as long as the assistant body 30 and the main body 20 are connected together.

Reference is made to FIG. 4a continuingly, the electronic device is provided in the state shown in FIG. 4a currently, for example, in the first position relation. If an user wants to adjust the state of the electronic device into the second position relation, firstly, the assistant body 30 may be detached from the main body 20 to separate the both, as shown in FIG. 4*b*. Then the user may rotate the assistant body 30 in the state of FIG. 4*b* by 180 degrees, and then may connect the assistant body 30 to the main body 20, and thereby the state shown in FIG. 11 is presented, that is, the state is adjusted to the second position relation. That is, in the case that the assistant body 30 is connected to the main body 20 in such a manner that the fifth surface 301 and the first surface 1011 are on the same side of the main body 20, the fifth surface 301 and the first surface 1011 are in the first position relation; and in the case that the assistant body 30 is connected to the main body 20 in such a manner that the fifth surface 301 intersects with the first surface 1011 and the third surface 1016, the fifth surface 301 and the first surface 1011 are in the second position relation.

In this implement state, the connecting unit 304 may be a hook and a slot, or may also be a magnetic element, by the magnetic force of which the assistant body 30 and the main body 20 are connected. Certainly, in practice, the connecting unit 304 may have other structures, as long as it may be ensured that the assistant body 30 still may be connected to the main body 20 after the assistant body 30 is rotated by a certain angle.

No matter the first implement form or the second implement form above-mentioned, in practice, the main body 20 and the assistant body 30 both may have other structures. For example, the sixth surface 1014 is perpendicular to the first surface 1011, the sixth surface 1014 is an arc and is bent toward the second surface 1012, and the assistant body 30 is a cylinder or a hollow cylinder, and the size of the cylinder matches the arc of the sixth surface 1014. For simplicity, it would not be listed one by one herein.

Furthermore, in an embodiment, the operating modes of the electronic device are different in different position relations. For example, the electronic device has a first operating mode and a second operating mode different from the first operating mode, the electronic device is in the first operating mode in the case that the fifth surface 301 and the first surface 1011 is in the first position relation, and the electronic device is in the second operating mode in the case that the fifth surface 301 and the first surface 1011 is in the second position relation.

The operating modes of the electronic device are slightly different in different cases. For example, an operating mode is with respect to a camera unit. It is provided that the camera unit is disposed on the main body 20 or the assistant body 30, and the camera unit may change the collection area via different position relations. For example, an operating mode is with respect to an illumination unit. It is provided that the illumination unit is disposed in the main body 20 or the assistant body 30, and the illumination unit may change the illuminated area by changing the position relation. In the following, an operating mode with respect to a projection unit which is taken as an example is described.

The electronic device further includes a projection unit disposed on the main body 20 or the assistant body 30, a first operating mode is a first projection mode and a second operating mode is a second projection mode, the first projection mode is different from the second projection mode. The first position relation and the second position relation are that for example, as described in the first implement state and the second implement state above, the first position relation is a position relation that the fifth surface 301 and the first surface 1011 are on the same side of the electronic device, or a position relation that the fifth surface 301 is opposite to the first surface 1011; and the second position relation is a position relation that a third angle formed between the fifth surface 301 and the first surface 1011 is not of zero degrees.

Furthermore, in an embodiment, in the case of the first projection mode, a light path of the projection unit is projected from the first light passway on the fifth surface 301 which is in the first position relation; and in the case of the second projection mode, the light path of the projection unit is projected from the second light passway on the fifth surface 301 which is in the second position relation. In the division manner for the projection mode, no matter via which surface the electronic device contacts the supporting surface, all of them fall within the scopes of the embodiment.

Furthermore, in another embodiment, in the case that the electronic device is in the first projection mode, the electronic device stands on a supporting surface via the second surface 1012, there is a first angle α formed between the first surface 1011 and the supporting surface, the first angle α is not of zero degrees. The projection unit projects a second display content on a first bearing surface. In the case that the electronic device is in the second projection mode, the electronic device stands on the supporting surface via the third surface 1016, the projection unit projects a third display content on a second bearing surface.

Regarding to the first angle α, the first angle α may be of 90 degrees, may also be of more than 90 degrees, or may also be of less than 90 degrees, and the first angle α is not of zero degrees. Preferably, the first angle α is of 90 degrees. In this case, the main body 20 stands perpendicularly on the supporting surface, and a better projection angle for projecting the second display content or the third display content on the bearing surface is obtained, which is easy to view by the user.

In order that the main body 20 may stand stably on the supporting surface, preferably, the position of center of gravity of the electronic device is disposed between the second surface 1012 and the central plane of the electronic device, and the center of gravity of the electronic device is closer to the second surface 1012, the main body 20 is stabler.

Furthermore, in an embodiment, in order that the main body 20 may stand stably on the supporting surface for a longer time, as shown in FIG. 8*a* and FIG. 8*b*, the electronic device further includes a bracket 104, disposed on the third surface 1016 opposite to the first surface 1011, which supports the main body 20 to stand on the supporting surface together with the second surface 1012.

In practice, there are many implement ways for the structure of the bracket 104, and there are many manners for connecting the bracket 104 to the main body 20, which is known by those skilled in the art. In the following, the bracket 104 and the manners for connecting the bracket 104 and the main body 20 are described.

For example, a recess 105 is provided on the third surface 1016, and one end of the bracket 104 may be connected to one side of the recess 105, by a rotation shaft or a spring piece. When the bracket 104 is not required, the bracket 104 may be held in the recess 105. Preferably, the recess 105 matches the bracket 104 in shape, and therefore the third surface 1016 is looked as a plane in appearance when the bracket 104 is held in the recess 105. When the bracket 104 is required, the bracket 104 may be rotated out of the recess 105 by the other end of the bracket 104, so that the bracket 104 and the second surface 1012 may support the electronic device together. As can be seen, such structure makes the appearance of the electronic device beautiful and the structure is simple, and no additional bracket is required to support the electronic device.

Furthermore, in another embodiment, in the case that the electronic device is in the first projection mode, the electronic device stands on a supporting surface via the second surface 1012, there is a first angle α formed between the first surface 1011 and the supporting surface, the first angle α is not of zero degrees; the projection unit projects a second display content on a first bearing surface via the first light passway; and in the case that the electronic device is in the second projection mode, the electronic device stands on the supporting surface via the third surface 1016, the projection unit projects a third display content on a second bearing surface via the first light passway.

In the specific implementation, there are three cases according to the different surfaces at which the light passway is located, in the case of the first projection mode.

Figure 13A:
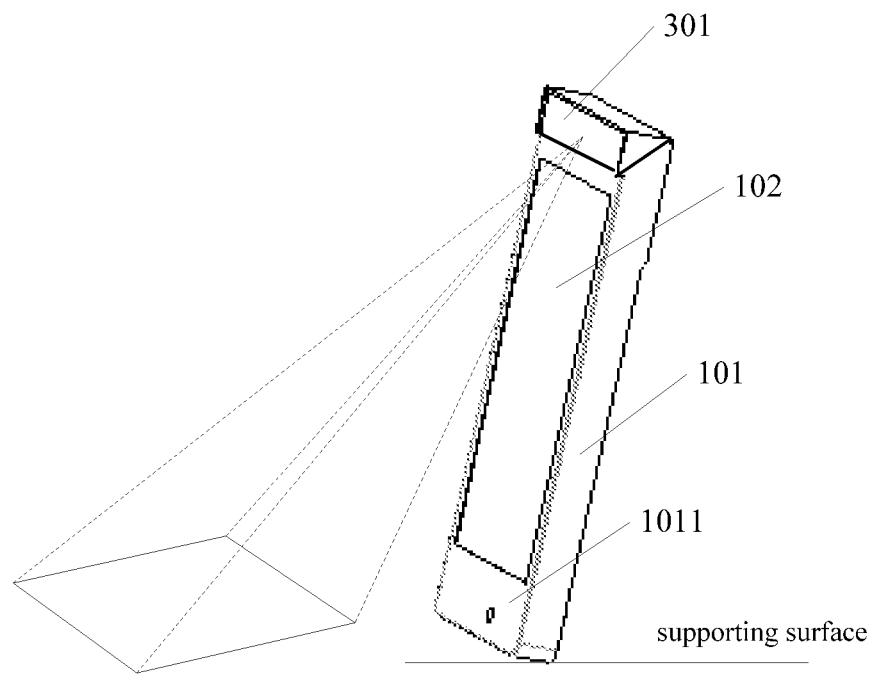
FIGS. 13a-13b are projection schematic views in the first projection mode according to an embodiment of the present application.

A first case: the fifth surface 301 has a first light passway, the projection unit projects the second display content on the first bearing surface, for example, the supporting surface, via the first light passway, as shown in FIG. 13a.

Figure 13B:
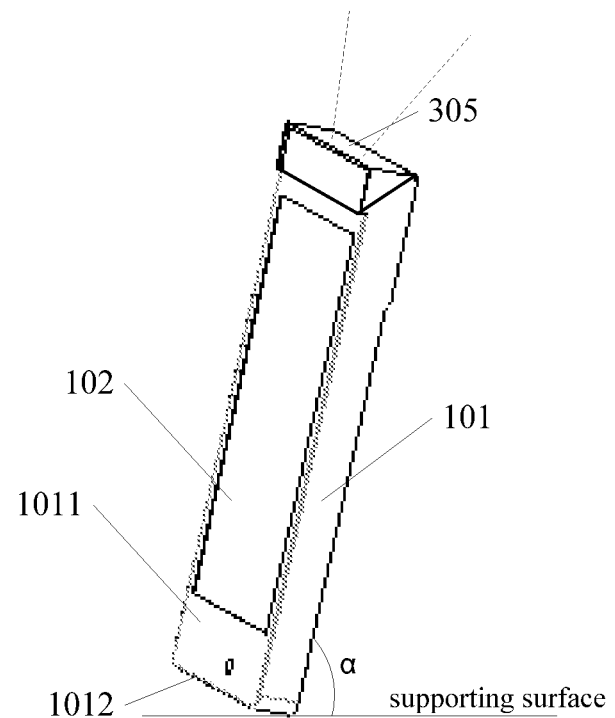

A second case: the fourth surface 305 a second light passway and the fifth surface 301 has no light passway, the projection unit projects the second display content on the first bearing surface, for example, the ceiling, via the second light passway, as shown in FIG. 13b.

A third case: an light passway is located on the fifth surface 301, that is, there is a first light passway, but no second light passway; and the projection unit is disposed in the main body 20 and the direction of output light for the projection unit is toward the fourth surface 305. The second display content needs to be projected on the supporting surface from the first light passway, that is, it is presented that the projection state shown in FIG. 13a. Therefore, in this embodiment, the assistant body 30 further includes: an first light path changing unit 306, which changes, in the case of the first projection mode, the light path of the projection unit so that the light path to pass the first light passway on the fifth surface 301 which is in the first position relation, as shown in FIG. 6.

The first light path changing unit 306 is, for example, a reflector. Certainly, in other embodiments, the first light path changing unit 306 may be other structures, for example, a reflector system, which is not limited in the present disclosure.

In this embodiment, the projection unit is disposed in the main body 20 and the location is not required to be changed, it is only required that the assistant body 30 is rotated to implement the projection in the same posture at two different angles and different directions. Therefore, the size of the assistant body 30 is small and the complex wiring and electric connection is not required.

In the case of the second projection mode, the electronic device stands on the supporting surface via the third surface 1016, the projection unit projects the third display content on the second bearing surface. There are three cases according to the different surfaces at which the light passway is located. These three cases correspond to and are similar to the three cases in the case of the first projection mode, which is described respectively in the following.

With regard to the first case, the position relation between the fifth surface 301 and the first surface 1011 is changed into the second position relation, for example, the state shown in FIG. 11. The electronic device stands on the supporting surface via the third surface 1016 as shown in FIG. 11, and the light path of the projection unit passes the first light passway on the first surface 1011, to project a third display content on a second bearing surface.

With regard to the second case, the position relation between the fifth surface 301 and the first surface 1011 is changed into the second position relation, for example, the state shown in FIG. 11. The electronic device stands on the supporting surface via the third surface 1016 as shown in FIG. 11. If the projection unit is rotated with the assistant body, the light path of the projection unit may still pass the second light passway on the fourth surface 305, to project the third display content on the second bearing surface.

If the projection unit is disposed in the main body 20 and the direction of output light for the projection unit is toward the fourth surface 305, after the position relation between the fifth surface 301 and the first surface 1011 is changed into the second position relation, the assistant body 30 should include the above-mentioned first light path changing unit 306, by which the path of the projection light path is changed to be projected out via the second light passway if the projection light path of the projection unit is still projected via the second light passway.

With regard to the third case, the position relation between the fifth surface 301 and the first surface 1011 is changed into the second position relation, for example, the state shown in FIG. 11. The electronic device stands on the supporting surface via the third surface 1016 as shown in FIG. 11. In this case, the first light path changing unit 306 has no effect on the light path, and therefore the light path of the projection unit passes the first light passway along the original light path to project the third display content on the second bearing surface.

In the above-mentioned embodiments, in the case that the projection unit is disposed in the main body 20, as shown in FIG. 4b, the sixth surface 1014 has a first opening 1015, the location of the first opening 1015 corresponds to the location of the projection unit and the projection light path of the projection unit may pass through the first opening 1015.

Next, the relationships among the first display content, the second display content and the third display content will be described in details.

In practice, the first display content and the second display content may be the same, or may be different. Specifically, the first display content and the second display content are the same, that is, it represents that the content of the both are completely the same. For example, the first display content and the second display content are both the desktop of the electronic device, and the same content is displayed by the display unit 102 and the projection unit.

The first display content and the second display content may be different, there are two cases. A first case: the both are completely different, that is, there is no association between the both completely. For example, the display unit 102 displays a game screen and a first user plays a game by the display unit 102, and the second display content projected by the projection unit is, for example, a movie screen, and a second user watches the movie by the projection screen.

A second case: the both are not exactly the same. For example, the display unit 102 displays two windows, a PPT window and a movie player window. The user only wants to project the PPT window to other users. In this case, the PPT window may be projected on the first bearing surface, for example the supporting surface, by the projection unit, which is easy to view by other users.

The second display content and the third display content are the projection content in different projection modes, the second display content and the third display content may be the same, or may be different. The relationship between the second display content and the third display content is similar to the relationship between the first display content and the second display content described above.

Therefore, in this embodiment, there are many modes for projection, may be adapted to more scenarios.

In the above-mentioned embodiments, the electronic device may be a smartphone, PDA, a tablet computer, or other handheld electronic devices.

One or more of the technical solutions according to the embodiments of the present disclosure have the following technical effects at least:

According to an embodiment of the present disclosure, the electronic device includes: a main body; a display unit, a connecting unit and an assistant body. The display unit is disposed on a first surface of the main body and displays a first display content. The assistant body may be connected to the main body via the connecting unit. When the assistant body is connected to the main body, the position relation between the fifth surface of the assistant body and the first surface may be a first position relation or a second position relation different from the first position relation. The main body and the assistant body present a first appearance in the first position relation, and the main body and the assistant body present a second appearance substantially the same as the first appearance in the second position relation. In this embodiment, when the two parts of the electronic device are in connection state, the appearances are substantially the same in two different position relations, so it may be ensured that the appearances are united and integrated in different position relations for the two parts of the electronic device.

Furthermore, according to an embodiment of the present application, the electronic device has a first operating mode and a second operating mode. The electronic device is in the first operating mode in the case that the fifth surface and the first surface is in the first position relation, and the electronic device is in the second operating mode in the case that the fifth surface and the first surface is in the second position relation. Therefore, in this embodiment, the operating modes for the electronic device correspond to the position relations between the two parts of the electronic device. The appearances of the electronic device are substantially the same even if the electronic device is in different operating modes.

Furthermore, according to an embodiment, the electronic device further includes a projection unit disposed on the main body or the assistant body. The first operating mode is a first projection mode and the second operating mode is a second projection mode, the first projection mode is different from the second projection mode. Therefore, in this embodiment, the same electronic device may implement two different projection modes, and it is implemented via the different position relations between the assistant body and the main body, and further the appearances of the electronic device are substantially the same in the case that the position relations between the assistant body and the main body are different.

The present disclosure provides an electronic device to solve a problem existing in the conventional technology that: a mode is single and a projection angle and a projection bearing surface are both limited since a projection device only has one projection mode.

The general idea of a technique solution according to embodiments of the present disclosure for solving the above technical problem is as follows.

An electronic device includes: a body; a display unit and a projection unit. The display unit is arranged on a first surface of the body and includes a first edge and a second edge which corresponds to the first edge and is parallel to the first edge. The projection unit is arranged in the body and supports first and second projection modes. In the case that the projection unit projects in the first mode, a content to be projected is projected into a first projection region corresponding to the projection unit and a first display interface corresponding to the content to be projected is formed on a first bearing surface of the first projection region with the first display interface being located on a first side corresponding to the first edge of the display unit. In the case that the projection unit projects in the second mode, the content to be projected is projected into a second projection region corresponding to the projection unit, and a second display interface corresponding to the content to be projected is formed on a second bearing surface of the second projection region, with the second display interface being located on a second side corresponding to the second edge of the display unit. It can be seen that, the electronic device provided in the embodiment has two projection modes, and the display interfaces corresponding to the content to be projected are located at different sides of the display unit under different projection modes. Therefore, it is solved the technical problem that the mode is single and the projection angle and the projection bearing surface are both limited since there is only one projection mode in the conventional technology. A technical effect that one projection device has two projection modes and the application scenarios of the projection device are increased is achieved.

In the following, the above technique solution is described in detail in conjunction with the specification, the drawings and specific embodiments, so that the above technique solution is understood better.

Figure 14:
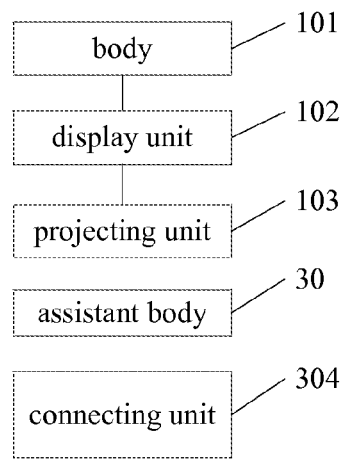
FIG. 14 is a functional block diagram of an electronic device according to an embodiment.
Figure 15:
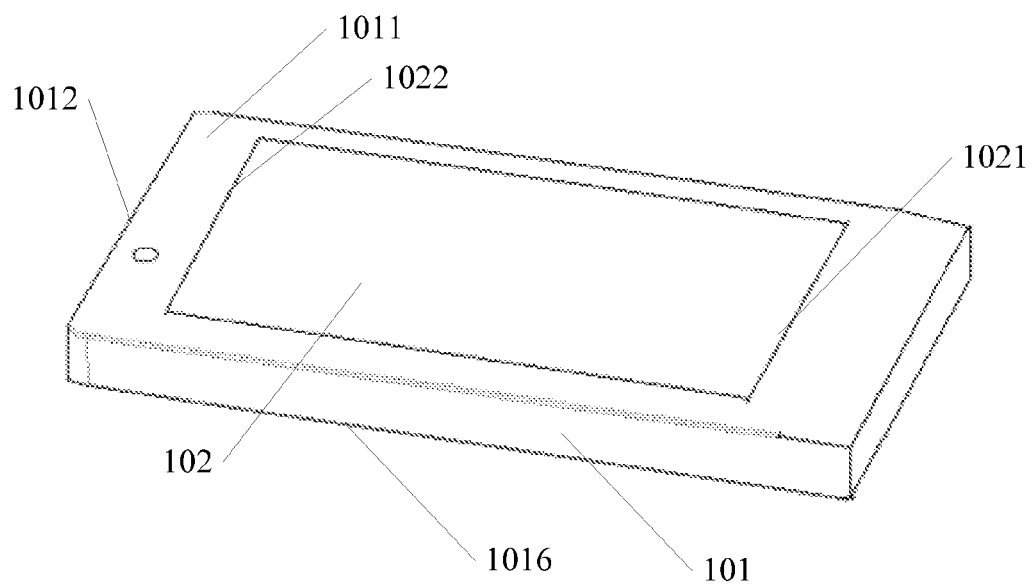
FIG. 15 is a structural diagram of an electronic device according to an embodiment.

An embodiment provides an electronic device. Referring to FIGS. 14 and 15, FIG. 14 is a functional block diagram of the electronic device according to the embodiment and FIG. 15 is a structural diagram of the electronic device according to the embodiment.

As shown in FIGS. 14 and 15, the electronic device includes: a body 101; a display unit 102 and a projection unit 103. The display unit 102 is arranged at a first surface 1011 of the body 101 and includes a first edge 1021 and a second edge 1022 which corresponds to the first edge 1021 and is parallel to the first edge 1021. The projection unit 103 is arranged in the body 101 and supports a first second projection mode and a second projection mode. In the case that the projection unit 103 projects in the first mode, a content to be projected is projected into a first projection region corresponding to the projection unit 103. A first display interface corresponding to the content to be projected is formed on a first bearing surface of the first projection region. The first display interface is located at a first side corresponding to the first edge 1021 of the display unit 102. In the case that the projection unit 103 projects in the second mode, the content to be projected is projected into a second projection region corresponding to the projection unit 103. A second display interface corresponding to the content to be projected is formed on a second bearing surface of the second projection region. The second display interface is located at a second side corresponding to the second edge 1022 of the display unit 102.

It can be seen that, the electronic device in the embodiment has two projection modes, and the display interfaces corresponding to the content to be projected are located on different sides of the display unit under different projection modes. Therefore, it is solved the technical problem that the mode is single and the projection angle and the projection bearing surface are both limited since there is only one projection mode in the conventional technology. A technical effect that one projection device has two projection modes and the application scenarios of the projection device are increased is achieved.

Figure 16:
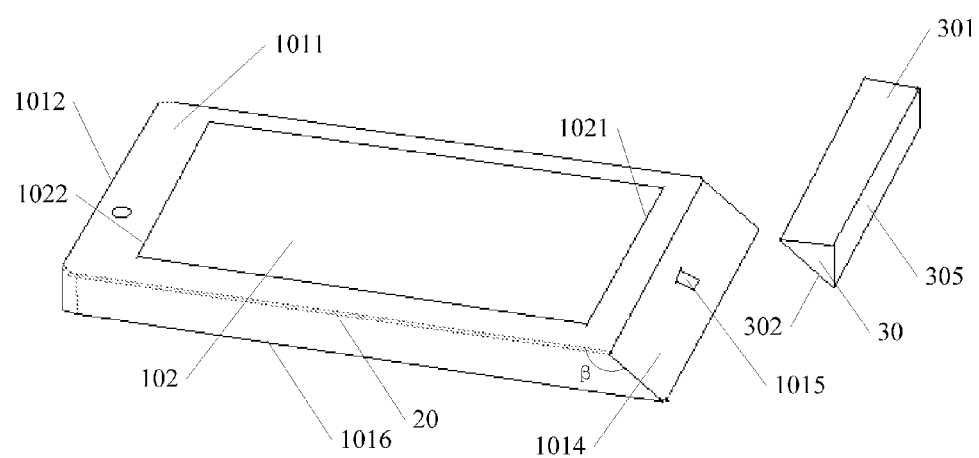
FIG. 16 is a structural diagram of an electronic device according to another embodiment.

In practice, in addition to the appearance of the electronic device shown in FIG. 15, that is, the electronic device is physically a whole, the appearance of the electronic device may further consist of two physically independent portions. For example, reference is further made to FIG. 16 which is another exemplary schematic structural diagram of the electronic device in the embodiment. As shown in FIG. 16, the body 101 includes a main body 20 and an assistant body 30. The main body 20 further has a second surface 1012 close to the second edge 1022. The body 101 further has a third surface 1016 and a sixth surface 1014. The third surface 1016 is opposite to the first surface 1011. The second surface 1012 intersects with both the first surface 1011 and the third surface 1016. The sixth surface 1014 which is connected to the first surface 1011 and the third surface 1016 is opposite to the second surface 1012 and close to the first edge 1021.

Further, referring to both the FIG. 14 and the FIG. 16, the electronic device further includes a connecting unit 304 which connects the main body 20 and the assistant body 30 rotatably. In the case that the main body 20 and the assistant body 30 are at a first relative position, the projection unit 103 may project in the first mode; in the case that the main body 20 and the assistant body 30 are at a second relative position differing from the first relative position, the projection unit 103 may project in the second mode.

In the following, the first and second projection modes are described by placing the electronic device in different ways.

Figure 17A:
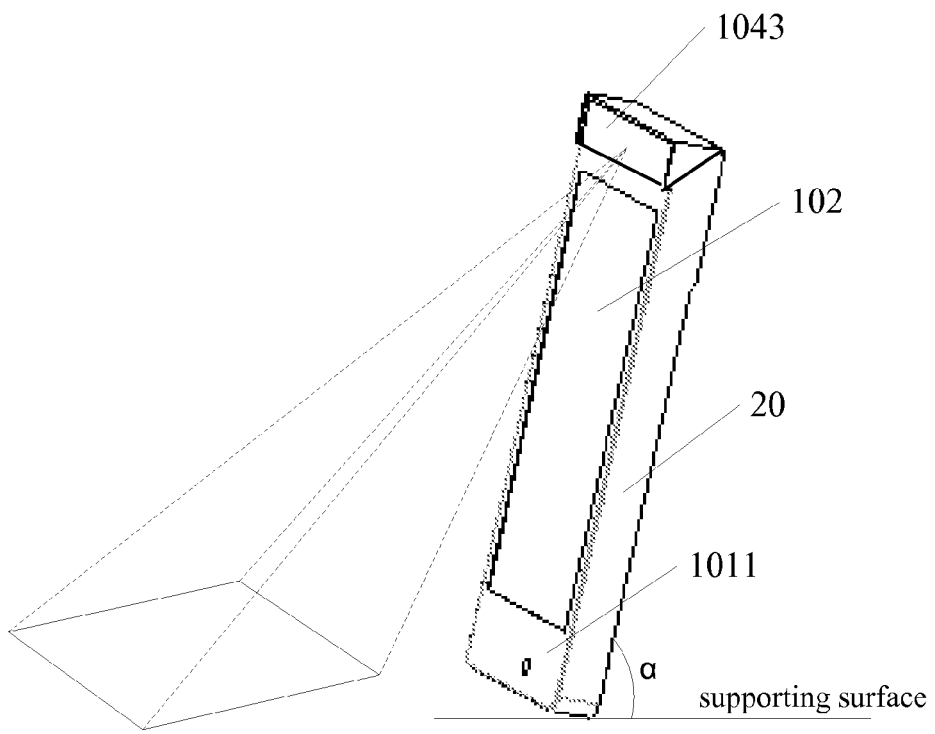
FIGS. 17a to 17c are schematic diagrams of different projection modes according to an embodiment.

In an embodiment, as shown in FIG. 17a, in the case that the projection unit 103 projects in the first mode, the body 101 stands on a supporting surface via the second surface 1012, and a first angle α formed between the first surface 1011 and the support surface is not of zero degrees. Preferably, a second bearing surface is the supporting surface. The second surface 1012 may be in either the appearance shown in FIG. 15 or the appearance shown in FIG. 16, FIGS. 15 and 16 may be referred to for the detail.

The state of the first angle α is that: the first angle α may be equal to, larger than or less than 90 degrees, but not of zero degrees. Preferably, the first angle α equals to 90 degrees, in this case, the body 101 vertically stands on the supporting surface and a projection angle for the content to be projected being projected on the supporting surface is better and convenient for a user to view.

In order to make the body 101 stand on the supporting surface stably, preferably, the center of gravity of the electronic device is arranged between the second surface 1012 and a center plane of the electronic device, and the closer the center of gravity of the electronic device is to the second surface 1012, the more stable the body 101 stands on the supporting surface.

Figure 17B:
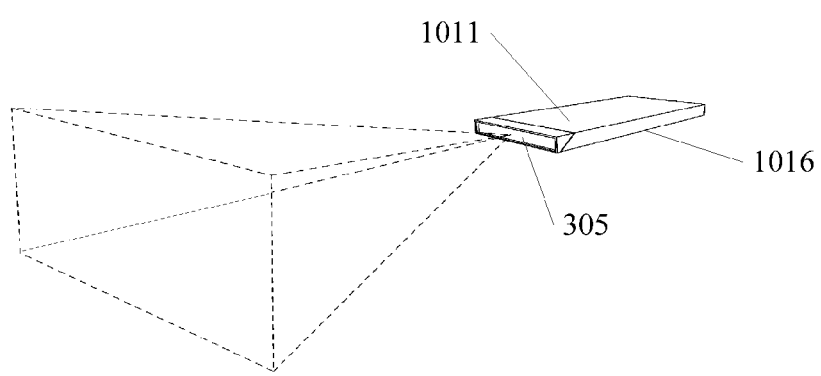

In an embodiment, as shown in FIG. 17b, in the case that the projection unit 103 projects in the second mode, the third surface 1016 of the body 101 (as shown in FIGS. 15 and 16) contacts the supporting surface. And preferably, a first bearing surface is specifically perpendicular to the supporting surface.

Next, the first and second projection modes are described with different light paths of the projection unit 103. In the embodiment, it is provided that the electronic device is in a status that the body 101 stands on a supporting surface via the second surface 1012 and a first angle αformed between the first surface 1011 and the supporting surface is not of zero degrees.

In an embodiment, continuing to refer to FIG. 17a, in the case that the projection unit 103 projects in the second mode, a light path of the projection unit 103 is projected via a surface on the assistant body 30 which is on the same plane with the first surface 1011. FIG. 17a is illustrated by taking the appearance of the electronic device in FIG. 16 as an example. Reference is further made to FIG. 3b in which the appearance of the electronic device in FIG. 15 is taken as an example. In FIG. 3b, in the case that the projection unit 103 projects in the second mode, the light path of the projection unit 103 is projected via the first surface 1011.

Figure 17C:
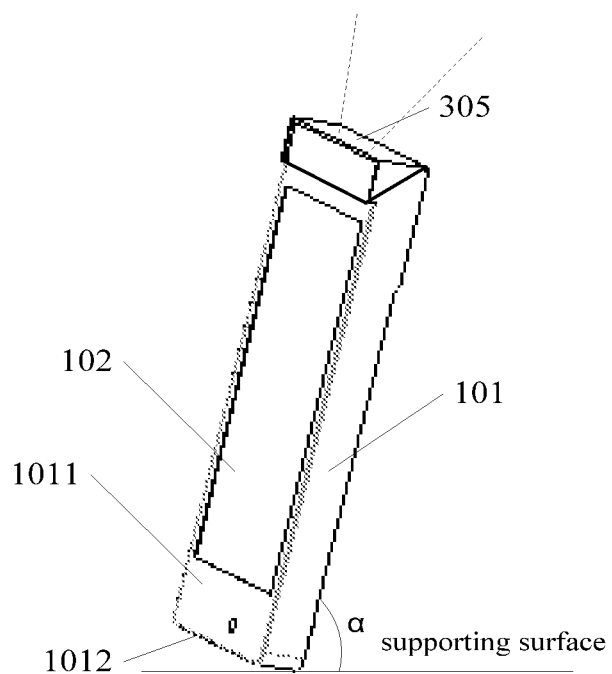

In an embodiment, continuing to refer to FIG. 17c, in the case that the projection unit 103 projects in the first mode, the light path of the projection unit 103 is projected via a surface on the assistant body 30 opposite to the second surface 1012. In FIG. 17c is illustrated by taking the appearance of the electronic device in FIG. 16 as an example. Reference is further made FIG. 3a in which the appearance of the electronic device in FIG. 15 is taken as an example. In FIG. 3a, in the case that the projection unit 103 projects in the first mode, the light path of the projection unit 103 is projected via a surface on the body 101 opposite to the second surface 1012.

Similarly, in the case that the electronic device is in a "lying" status that the body 101 contacts the supporting surface via the third surface 1016, the first and second modes may also correspond to different light paths of the projection unit 103, which will not be described hereinafter.

The first and second modes are described in the above from two different perspectives. In practice, the first and second modes may be divided by combining the two perspectives. For example, in FIG. 17a, in the case that the projection unit 103 projects in the second mode, the electronic device is in a "standing" status, and the light path of the projection unit 103 is projected via the surface on the assistant body 30 which is on the same plane with the first surface 1011. And in the case that the projection unit 103 projects in the first mode, the electronic device is in the "lying" status, and the light path of the projection unit 103 is projected via the surface on the assistant body 30 opposite to the second surface 1012.

Next, the connecting unit 304 is described. Referring to both FIGS. 16 and 12, the connecting unit 304 is vertically arranged on the sixth surface 1014, to make the assistant body 30 rotate relative to the main body 20 with respect to an axial direction which is perpendicular to the sixth surface 1014.

In a further embodiment, a second angle β is formed between the sixth surface 1014 and the first surface 1011, with the second angle β being an obtuse angle or an acute angle (FIG. 16 illustrates the case of an obtuse angle, subsequent embodiments are all described by taking the obtuse angle as an example, and which is similar for an acute angle). The assistant body 30 further has a seventh surface 302 and a fourth surface 305. The seventh surface 302 is opposite to the sixth surface 1014 and the fourth surface 305 is opposite to the second surface 1012. The connecting unit 304 connects the sixth surface 1014 and the seventh surface 302 respectively. The assistant body 30 further has a fifth surface 301 intersecting with the fourth surface 305.

Further, in the embodiment, the connecting unit 304 is connected to a center position between the sixth surface 1014 and the seventh surface 302. In the case that a position relation between the fifth surface 301 and the first surface 1011 is a first position relation, the may body 20 and the assistant body 30 have a first relative position. After the assistant body 30 is rotated by the connecting unit 304 along the center position for 180 degrees, the position relation between the fifth surface 301 and the first surface 1011 is a second position relation, and the main body 20 and the assistant body 30 have a second relative position.

As shown in FIG. 4a, in the case that the fifth surface 301 and the first surface 1011 are on the same side of the electronic device, it may be recorded that the position relation between the fifth surface 301 and the first surface 1011 is the first position relation. Preferably, in the embodiment, in the first position relation, the fifth surface 301 and the first surface 1011 are on the same plane. In the case that the second angle β is an acute angle, the first position relation may be specifically that: the fourth surface 305 and the first surface 1011 are at positions on two sides of the electronic device, that is, the fourth surface 305 and the third surface 1016 are on the same side of the electronic device. In this case, fifth surface 301 intersects with the first surface 1011, and preferably, the fourth surface 305 is on the same plane with the third surface 1016 under the first position relation.

In the case that the assistant body 30 is rotated about the connecting unit 304, FIG. 10 shows a status of the assistant body 30 after the assistant body 30 is rotated clockwise for 90 degrees from a status in FIG. 7a, then the assistant body 30 is rotated continuously, and the status of the assistant body 30 is presented as shown in FIG. 11 after the assistant body 30 is rotated clockwise for 180 degrees. In FIG. 11, an angle which is not equal to zero is formed between the fifth surface 301 and the first surface 1011, that is, the fifth surface 301 is opposite to the second surface 1012, which is recorded as the second position relation. And the fifth surface 301 is opposite to the first surface 1011, of the electronic device (the second angle β is the obtuse angle), or the fifth surface 301 and the third surface 1016 are on the same side of the electronic device (the second angle β is the acute angle).

It can be seen from FIGS. 7a and 11 that, a first appearance of the electronic device under the first position relation is substantially the same as a second appearance of the electronic device under the second position relation, so that the unity and integrity of the appearance of the electronic device is maintained. The "substantially the same" and "the same" here are for the whole appearance of the electronic device. For example, for the two appearances in FIGS. 7a and 11 are substantially both cuboids (may be processed to cuboids with fillets to make them beautiful). In the case of other structures, for example, the assistant body 30 is a cylinder having a tangent plane which is the seventh surface 302, or may be a quadripod with an eighth surface, for example, the eighth surface is located between the fifth surface 301 and the fourth surface 305. In this case, the electronic device is kept being bar-style model for both the first appearance and the second appearance. And for "substantially", on one hand, the first appearance and the second appearance are slightly different due to the difference in technology. For example, there may be an error in the mounted position of the connecting unit 304. For another example, there may be an error between connection circular arcs between surfaces on the assistant body 30. On the other hand, the "substantially" means that, there may be different structures on the fifth surface 301 or the fourth surface 305, or other surfaces of the assistant body 30, for example, there is a hole on the fifth surface 301 and the fourth surface 305 is a wavy convex.

Furthermore, in practice, the main body 20 and the assistant body 30 both may have other structures, for example, the sixth surface 1014 is perpendicular to the first surface 1011, which will not be described and enumerated one by one hereinafter for simplicity of the specification.

In the following, how the projection unit 103 switches between the first and second projection modes will be described in detail.

For the appearance of the electronic device as shown in FIG. 15, the electronic device further includes a first light path changing unit which is arranged in the body 101 and configured for changing the light path of the projection unit 103, so that the projection 103 switches between the first and second projection modes.

For the appearance of the electronic device as shown in FIG. 16, the assistant body 30 includes a first light path changing unit for changing the light path of the projection unit 103, so that the projection 103 switches between the first and second projection modes. No matter which appearance the electronic device is, and no matter whether the first light path changing unit is arranged in the main body 20 or the assistant body 30, in an embodiment, in the case that the main body 20 stands on a supporting surface via the third surface 1016, the first light path changing unit is in a first status and the projection unit 103 projects in the first mode. In the case that the main body 20 stands on the supporting surface via the second surface 1012, the first light path changing unit is in a second status and the projection unit 103 projects in the second mode.

For example, in the case of the appearance of the electronic device in FIG. 15, in the case that the projection unit 103 projects in the first mode, the first light path changing unit is not located on the light path of the projection unit 103, hence the light path of the projection unit 103 is directly projected through a light passway on the surface opposite to the second surface 1012. When the projection unit 103 projects in the second mode, the first light path changing unit is located on the light path of the projection unit 103 to change the light path of the projection unit 103, so that the light path comes out through a light passway on the first surface 1011.

And for example, in the case of the appearance of the electronic device in FIG. 16, when the projection unit 103 projects in the first mode, the first light path changing unit is not located on the light path of the projection unit 103, hence the light path of the projection unit 103 is directly projected through a first light passway on the fourth surface 305 of the assistant body 30. In the case that the projection unit 103 projects in the second mode, the first light path changing unit is located on the light path of the projection unit 103, thereby the light path of the projection unit 103 projects a content to be projected onto a second bearing surface through a second light passway on the fifth surface 301 of the assistant body 30. The fifth surface 301 is on the same plane with the first surface 1011 or is opposite to the first surface 1011. In the embodiment, since the light direction of the projection unit 103 is a direction facing to the fourth surface 305, if a projection in the second mode is required the first light path changing unit should be used to change the light path of the projection unit 103, so that the light path comes out through a second channel on a surface on the assistant body 30 which is on the same plane with the first surface 1011 or which is opposite to the first surface 1011.

Next, how to control the projection unit 103 to switch between the first and second projection modes is described. In practice, the switching may be divided into a manual switching and an automatic switching.

There are multiple embodiments for the manual switching. For example, in an embodiment, a first light path changing unit may include a reflector and a rotating part which are connected to each other. In practice, the rotating part may protrude out of the body 101, so that a user may rotate the rotating part manually to adjust the position or reflecting angle of the reflector.

For another example, for the connecting unit 304 in FIG. 12 and the structure of the assistant body 30 in FIG. 16, the user may rotate the assistant body 30 manually. After the assistant body 30 is rotated about the above axial direction by the connecting unit 304, the fourth surface 305 and the first surface 1011 are on the same plane (the second angle β is the obtuse angle), as shown in FIG. 11. If the second angle β is the acute angle, the fifth surface 301 is opposite to the first surface 1011, that is, the fifth surface 301 and the third surface 1016 are on the same plane. Also referring to FIG. 11 which is an internal structural diagram of the assistant body 30, a first light path changing unit 306 included in the assistant body 30 is configured to change the light path of the projection unit 103 in the case that the projection unit 103 projects in the second mode, so that the light path passes through a first light passway on the fourth surface 305 and the content to be projected is projected onto the second bearing surface.

The first light path changing unit 306 is specifically, for example, a reflector. Of course, the first light path changing unit 306 may have other structures in other embodiments, such as a reflector system, which is not limited in the present application.

In the case that the position relation between the fifth surface 301 and the first surface 1011 is changed into the second position relation, such as the status shown in FIG. 7a, and the electronic device is placed on the supporting surface via the third surface 1016 as shown in FIG. 17b, the first light path changing unit 306 no longer effects the projective light path. Therefore, the light path of the projection unit 103 passes through the first light passway along the original light path and the content to be projected is projected onto the first bearing surface.

In practical applications, there may be other manual switching ways which will not be enumerated one by one. Next, the automatic switching is described with examples.

The electronic device further includes a controlling unit arranged in the body 101, which controls the projection unit 103 to switch between the first and second projection modes based on a triggering condition.

With regard to the triggering condition, specifically, for example, the electronic device further includes a detection unit for detecting whether the body 101 stands on a supporting surface via the third surface 1016 or via the second surface 1012. The controlling unit switches the projection unit 103 to projects in the first mode based on a triggering condition that the body 101 stands on the supporting surface via the third surface 1016, or switch the projection unit 103 to projects in the second mode based on a triggering condition that the body 101 stands on the supporting surface via the second surface 1012.

The detection unit is, for example, a gravity sensor, a gyroscope or other electrical elements that may detect a posture of the electronic device.

For another example, the triggering condition is a triggering instruction received by the electronic device. For example, the projection unit is switched to project in the first mode if the electronic device starts an application of a first type; the projection unit is switched to project in the second mode if the electronic device starts an application of a second type.

For a further example, the electronic device provides a selection interface. The user may select a projection mode through the selection interface. If the user selects an option, the electronic device may receive a triggering command and switch the projection unit to a projection mode based on the triggering command.

With respect to the control of the projection unit 103 on how to switch between the first and second projection modes, the electronic device further includes a motor. The motor controls the first light path changing unit to change the position, such as performing a rotation or a straight-line displacement, based on the instruction of the controlling unit, and further adjust the first light path changing unit, such as the reflector, or the reflecting angle or position of the reflector system. The initiative switching mode is adapted to the appearances of the electronic devices in FIGS. 15 and 16.

In practice, there is further a switching mode which depends on a physical feature of the first light path changing unit without any controlling or manual switching. For example, in the case that the electronic device stands on the supporting surface via the second surface 1012, the physical feature of the first light path changing unit may be changed into a second status in which the light path of the projection unit 103 can be reflected to make the light path projected from the surface on the same plane with the first surface 1011. In the case that the electronic device stands on the supporting surface via the third surface 1016, the physical feature of the first light path changing unit is changed into a first status in which the light path of the projection unit 103 can pass through the first light path changing unit and is projected from the surface opposite to the second surface 1012.

In the above embodiments, as shown in FIG. 16, there is a first opening 1015 posited on the sixth surface 1014. The location of the first opening 1015 corresponds to the location of the projection unit 103. Hence the projective light path of the projection unit 103 may pass through the first opening 1015 and arrive at the assistant body 30.

For a convenient control on the electronic device, in an embodiment, the electronic device further includes: a gesture detection unit, which detects whether there is a gesture input in the case that the projection unit projects in the first and second modes or only in the second mode; a first processing unit, arranged in the body 101, which performs an operation corresponding to the gesture input in response to the gesture input when there is the gesture input.

In a first case, no matter the projection unit projects in the first mode or the second mode, the gesture detection unit may operate and detect whether there is the gesture input, and the electronic device may also perform an operation corresponding to the gesture input with the first processing unit in response to the gesture input.

In a second case, only if the projection unit projects in the second mode, the gesture unit may operate and detect whether there is the gesture input, or the first processing unit may respond to the gesture input.

In a further embodiment, the first processing unit performs an operation corresponding to the gesture input for a content to be projected, in response to the gesture input. That is, in the embodiment, the gesture input is only effective to the projection content and may not directly affect a content displayed on the display unit 102. In this case, the projection content may be operated more directly and more effectively.

In practice, the gesture detection unit may be arranged either in the main body 20 or in the assistant body 30. In the following, the gesture detection unit being arranged in the main body 20 is taken as an example to be described.

Figure 18:
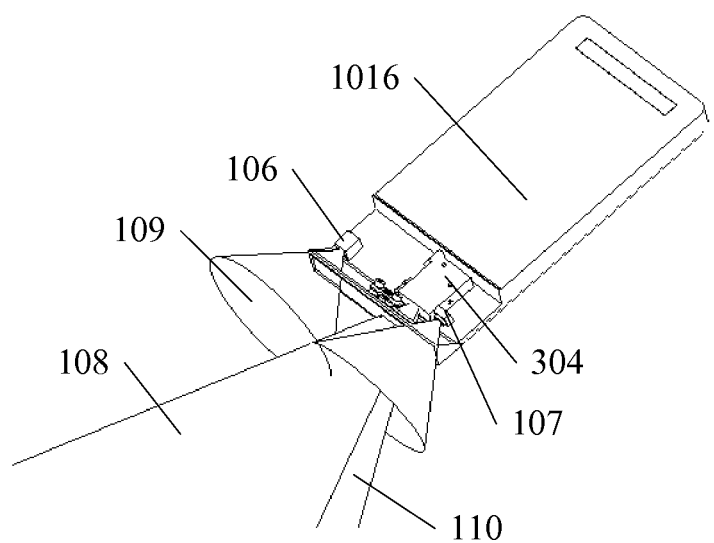
FIG. 18 is a structural diagram of a distribution of a component according to an embodiment.

As shown in FIG. 18, the projection unit 103 is arranged in the main body 20, a light path 108 of the projection unit 103 passes through the sixth surface 1014, passes out of the assistant body 30, and projects the content to be projected on a bearing surface of a projection region.

The gesture detection unit, for example, includes a transmitter 106 and a receiver 107. A transmitting path 109 of the transmitter 106 and a receiving path 110 of the receiver 107 are both the same as the light path 108. Therefore, regardless of the projection mode, the gesture detection unit may detect a gesture input of a user conveniently. Optionally, the transmitter 106 and the receiver 107 are respectively located at the left and right sides of the projection unit 103. In practice, both the transmitter 106 and the receiver 107 operate in an infrared principle.

Of course, in other embodiments, the gesture detection unit may also be other detection units, such as a camera.

A relation between the content displayed on the display unit 102 and the content to be projected is that: if a first display content is displayed on the second display interface, a second display content is displayed on the display unit 102, and a third display content is displayed on the first display interface, the first display content may be the same as or different from the second display content, and the second display content may be the same as or different from the third display content.

When the first display content is the same as the second display content, it is indicated that the two contents are completely the same. For example, both the two contents are a desktop of the electronic device, and the same content is displayed respectively by the display unit 102 and the projection unit 103.

When the first display content is different from the second display content, there are two cases. In a first case, the first display content is completely different from the second display content, that is, there is completely no association between the two contents. For example, a game screen is displayed on the display unit 102 and a first user plays the game by the display unit 102; and the first display content projected by the projection unit 103, for example, is a movie screen and a second user sees the movie on the projection screen.

In the second case, the two contents are not completely the same. For example, there are two windows displayed on the display unit 102 with one being a PPT window and the other being a movie player window. However, the user only wants to project the PPT window for other users to view. In this case, only the PPT window is projected onto the second bearing surface, such as the supporting surface, by the projection unit 103 for the other users to view.

The first and third display contents are projection contents in different projection modes, hence the two contents may be the same or different. And the relation between the first and third display contents is similar to the above description of the relation between the first and second display contents.

Next, it is described an interaction between the first and second display contents in the case that the first display content is different from the second display content.

The electronic device further includes: a second processing unit which changes the status of the first display content based on a first triggering operation and change, when the change of the status of the first display content meets a predetermined condition, the status of the second display content based on the changed status of the first display content. In the following, an example is described.

Figure 19A:
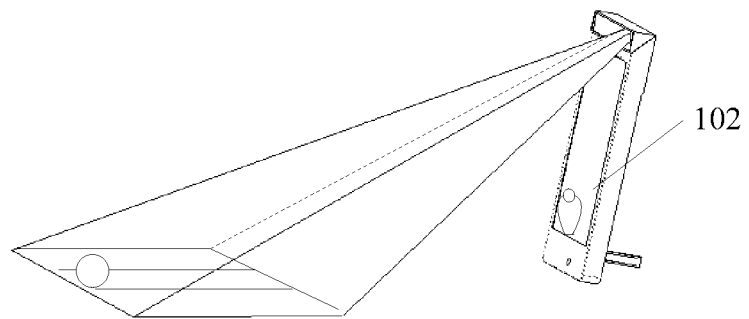
FIGS. 19a to 19b are schematic diagrams of interactions between a projection interface and a display unit according to an embodiment.

Referring to FIG. 19a, it is provided that the user wants to play a bowling game, an application of the bowling game is started in the body 101, the content related to bowling pins are displayed on the display unit 102, contents respectively corresponding to the bowling pins and a bowling track are projected on the second display interface by the projection unit 103. And then the user may trigger the bowling ball to move along the track. Specifically, the user triggers the bowling ball to move, for example, the user makes an action pushing out the bowling ball, then the gesture is detected by, for example, the above gesture detection unit, and the bowling ball is controlled to move along the track, that is, the status of the first display content is changed.

Figure 19B:
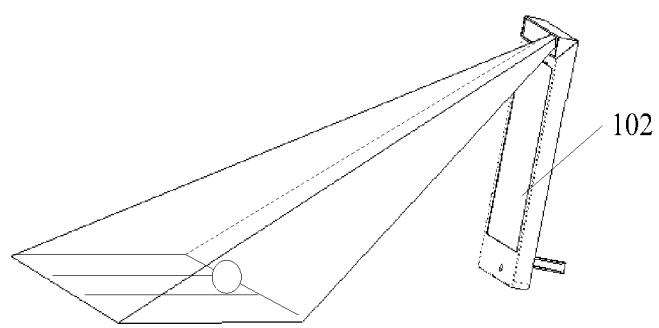

When the change of the status of the first display content meets a predetermined condition, the status of the second display content is changed based on the changed status of the first display content. Continuing to refer to FIG. 19b, if the bowling ball moves to the end of the track, such as a boundary of the second display interface, it is indicated that the bowling ball has arrived at the place of the bowling pins and hit the bowling pins. Then the status of the second display content is controlled to be changed correspondingly. In the embodiments, since the bowling ball hits the bowling pins, the status of the second display content is changed into a status in which the bowling pins fall down.

The above are only examples and are not used to limit the present disclosure. In practice, there may be various interactions between the display unit 102 and the projection display interface, which will not be enumerated one by one. With the embodiment, the projection function is increased, a human-machine interface is more humanize, and the user-experience is good.

In the aforementioned embodiments, the electronic device may be a smart phone, a PDA, a tablet computer or other electronic devices which may be used in a handheld manner.

In an embodiment of the present disclosure, an electronic device includes: a body, a display unit and a projecting unit. The body includes a first surface and a second surface which intersects the first surface, wherein the second surface supports the body in a standing position on a support surface at a first angle which is not zero degrees between the second surface and the support surface. The display unit is disposed on the first surface and displays a first display content. The projecting unit is disposed on the body and projects a second display content on a first bearing surface when the body stands on the support surface. The first bearing surface is the support surface. As can be seen, when the electronic device in the embodiment is used, the second surface, intersecting with the first surface on which the display unit is located, contacts with the support surface, thus the electronic device may stand on the support surface. The electronic device performs a projection in a posture similar to "standing" on the support surface, thus the electronic device may stand to project is provide in the embodiment, solving the problem in the conventional technology that both a projection angle and a projection bearing surface are limited because a projection may only be performed at a surface opposite to a displayer being placed on a support surface when a projector is used.

In the embodiment of the disclosure, the electronic device stands on the support surface and projects the second content on the support surface. For example, the electronic device stands on a desk, and project the second content on the desk by the projecting unit. Thus, a user may view the display content on the desk conveniently, which conforms to user custom and provides a better user experience.

In a further embodiment of the disclosure, the first display content displayed on the display unit may be different from the second display content projected on the first bearing surface. For example, a video player interface is displayed on the display unit while the second display content may be, for example, a document in WORD to be viewed by a different user at the same time. Thereby the electronic device may be applied to more scenarios.

According to an embodiment of the present application, the electronic device includes: a main body; a display unit, a connecting unit and an assistant body. The display unit is disposed on a first surface of the main body and displays a first display content. The assistant body may be connected to the main body via the connecting unit. When the assistant body is connected to the main body, the position relation between the fifth surface of the assistant body and the first surface may be a first position relation or a second position relation different from the first position relation. The main body and the assistant body present a first appearance in the first position relation, and the main body and the assistant body present a second appearance substantially the same as the first appearance in the second position relation. In this embodiment, when the two parts of the electronic device are in connection state, the appearances are substantially the same in two different position relations, so it may be ensured that the appearances are united and integrated in different position relations for the two parts of the electronic device.

Furthermore, according to an embodiment of the present application, the electronic device has a first operating mode and a second operating mode. The electronic device is in the first operating mode in the case that the fifth surface and the first surface are in the first position relation; and the electronic device is in the second operating mode in the case that the fifth surface and the first surface are in the second position relation. Therefore, in this embodiment, the operating modes for the electronic device correspond to the position relations between the two parts of the electronic device. The appearances of the electronic device are substantially the same even if the electronic device is in different operating modes.

Furthermore, according to an embodiment, the electronic device further includes a projection unit disposed on the main body or the assistant body, the first operating mode is a first projection mode and the second operating mode is a second projection mode, the first projection mode is different from the second projection mode. Therefore, in this embodiment, one electronic device may implement two different projection modes, and which is achieved via different position relations between the assistant body and the main body. Further more, the appearances of the electronic device are substantially the same in the case that the position relations between the assistant body and the main body are different.

In an embodiment, an electronic device includes: a body; a display unit and a projection unit. The display unit is arranged on a first surface of the body and includes a first edge and a second edge which corresponds to the first edge and is parallel to the first edge. The projection unit is arranged in the body and supports first and second projection modes. In the case that the projection unit projects in the first mode, a content to be projected is projected into a first projection region corresponding to the projection unit and a first display interface corresponding to the content to be projected is formed on a first bearing surface of the first projection region with the first display interface being located on a first side corresponding to the first edge of the display unit. In the case that the projection unit projects in the second mode, the content to be projected is projected into a second projection region corresponding to the projection unit, and a second display interface corresponding to the content to be projected is formed on a second bearing surface of the second projection region, with the second display interface being located on a second side corresponding to the second edge of the display unit. It can be seen that, the electronic device provided in the embodiment has two projection modes, and the display interfaces corresponding to the content to be projected are located at different sides of the display unit under different projection modes. Therefore, it is solved the technical problem that the mode is single and the projection angle and the projection bearing surface are both limited since there is only one projection mode in the conventional technology. A technical effect that one projection device has two projection modes and the application scenarios of the projection device are increased is achieved.

The disclosure is described with reference to the flow charts and/or the block diagrams of the methods, the apparatus (the system) and the computer program products according to the embodiments of the disclosure. It should be understood that, each flow and/or block in the flow charts and/or the block diagrams and a combination of the flows and/or the blocks in the flow charts and/or the block diagrams may be achieved by the computer program instructions. These computer program instructions may be provided to a general-purpose computer, a dedicated computer, an embedded processor or processors of other programmable data processing apparatus to generate a machine, such that a device for achieving the function specified in one or more flow in the flow charts and/or one or more block in the block diagrams is generated by performing the instructions by the computer or the processors of other programmable data processing apparatus.

These computer program instructions may be stored in a computer readable memory which may guide the computer or other programmable data processing apparatus to work in the specific way, such that the instructions stored in the computer readable memory generate manufactures including an instruction device, which achieves the function specified in one or more flow in the flow charts and/or one or more blocks in the block diagrams.

These computer program instructions may be loaded into the computer or other programmable data processing apparatus, such that a series of operating steps are performed on the computer or other programmable apparatus to generate the process achieved by the computer, thereby the instructions performed on the computer or the programmable apparatus provide steps for achieving the function specified in one or more flow in the flow charts and/or one or more block in the block diagrams.

Clearly, possible variations and changes may be made to the technical solution of the present disclosure by those skilled in the art without departing from the spirit and the scope of the present disclosure. Thus, the present disclosure intends to include these variations and changes if they are within the scope of the claims of the disclosure and the equivalent techniques.

The invention claimed is:

1. An electronic device, comprising:
   a body,
   a display unit, and
   a projecting unit;
   wherein the body comprises a first surface and a second surface which intersects the first surface, wherein the second surface supports the body in a standing position on a support surface at a first angle which is not zero degrees between the second surface and the support surface;
   the display unit is disposed on the first surface and displays content; and
   the projecting unit is supported by the body and projects content externally when the body stands on the support surface;
   wherein when an output light direction of the projecting unit is a direction towards a fourth surface opposite to the second surface, the electronic device further comprises:
   a first light path changing unit disposed between the projecting unit and the fourth surface, where a position relation between the first light path changing unit and the fourth surface comprises a first relative position and a second relative position, and in a case that the first light path changing unit is in the first relative position, the first light path changing unit changes a light path of the projecting unit to a direction towards the fourth surface.

2. The electronic device according to claim 1, wherein the content
   displayed on the first surface is different from the content projected externally.

3. The electronic device according to claim 2, wherein
   the body comprises a main body and an assistant body, and the electronic device further comprises a connecting unit which connects the main body with the assistant body;

the display unit is disposed on the main body; and the assistant body comprises a fifth surface, the first surface comprises the fifth surface and the surface on which the display unit is located, and a first light passway is formed on the fifth surface.

4. The electronic device according to claim 3, where the assistant body further comprises a fourth surface opposite to the second surface, and a position of the fourth surface and a position of the fifth surface are interchanged after the assistant body is rotated with respect to a center of the connecting unit by a predetermined angle.

5. The electronic device according to claim 3, where the assistant body is detachably connected to the main body by the connecting unit.

6. The electronic device according to claim 3, wherein the assistant body is a triangular prism.

7. The electronic device according to claim 6, wherein the assistant body is rotatably connected to the main body by the connecting unit, the connecting unit being disposed at a central position of a sixth surface and a seventh surface.

8. The electronic device according to claim 7, wherein in a case that the fifth surface and the first surface is in the first position relation, the fifth surface and the first surface is in the second position relation after the assistant body is rotated by 180 degrees with respect to the central position by means of the connecting unit.

9. The electronic device according to claim 1, wherein the projecting unit projects content externally on a first bearing surface, and the first bearing surface is the support surface.

10. The electronic device according to claim 9, wherein a second light passway is formed on the fourth surface, and in a case that the first light path changing unit is in the second relative position, a light path of the projecting unit passes through a second light path and projects content on a surface which is different from the support surface.

11. The electronic device according to claim 1, wherein the body further comprises a third surface opposite to the first surface; wherein a first light passway is formed on a first end of the first surface or third surface away from the second surface, and a light path of the projecting unit passes through the first light passway and projects content on the support surface.

12. The electronic device according to claim 1, further comprising:

a bracket, disposed on a third surface opposite to the first surface which supports, together with the second surface, the body to stand on the support surface.

13. The electronic device according to claim 12, wherein a recess is formed on the third surface, in which the bracket is held.

14. The electronic device according to claim 1, wherein the body comprises a main body and an assistant body, the electronic device further comprises a connecting unit; and the assistant body is coupled to the main body by the connecting unit;

wherein a fifth surface of the assistant body and the first surface is in a first position relation or a second position relation different from the first position relation, the main body and the assistant body have a first appearance in the case of the first position relation, and the main body and the assistant body have a second appearance substantially the same as the first appearance in the case of the second position relation.

15. The electronic device according to claim 14, wherein the electronic device has a first operating mode and a second operating mode different from the first operating mode, the electronic device is in the first operating mode in a case that the fifth surface and the first surface is in the first position relation, and the electronic device is in the second operating mode in a case that the fifth surface and the first surface is in the second position relation.

16. The electronic device according to claim 15, wherein the projection unit disposed on the main body or the assistant body, the first operating mode is a first projection mode and the second operating mode is a second projection mode, the first projection mode being different from the second projection mode.

17. The electronic device according to claim 16, where the first position relation is a position relation that the fifth surface and the first surface are on the same side of the electronic device, or a position relation that a fourth surface of the assistant body is opposite to the first surface; and the second position relation is a position relation that a third angle formed between the fifth surface and the first surface is not zero degrees.

18. The electronic device according to claim 16, wherein a third surface is opposite to the first surface, the second surface intersects with the third surface;

in the case that the electronic device is in a first projection mode, the electronic device stands on a supporting surface via the second surface, a first angle is formed between the first surface and the supporting surface, the first angle is not of zero degrees, and the projection unit projects a second display content on a first bearing surface; and in the case that the electronic device is in a second projection mode, the electronic device stands on the supporting surface via the third surface, the projection unit projects a third display content on a second bearing surface.

19. The electronic device according to claim 18, wherein the fifth surface has a first light passway, the projection unit projects the second display content on the first bearing surface via the first light passway in the case of the first projection mode, and the projection unit projects the third display content on the second bearing surface via the first light passway in the case of the second projection mode.

20. The electronic device according to claim 19, wherein in the case that the projection unit is disposed in the main body and the direction of output light for the projection unit is toward the fourth surface, the assistant body further comprises:

a first light path changing unit which changes, in the case of the first projection mode, the light path of the projection unit to make the light path pass the first light passway on the fifth surface which is in the first position relation.

21. The electronic device according to claim 1, wherein the display unit comprises a first edge and a second edge which corresponds to the first edge and which is parallel to the first edge; and the projection unit, supporting a first projection mode and a second projection mode; where, in the case that the projection unit projects in the first projection mode, a content to be projected is projected into a first projection region corresponding to the projection unit, and a first display interface corresponding to the content to be projected is formed on a first bearing surface of the first projection region, with the first display interface being located on a first side corresponding to the first edge of the display unit;

in the case that the projection unit projects in the second projection mode, the content to be projected is projected into a second projection region corresponding to the projection unit, and a second display interface corresponding to the content to be projected is formed on a second bearing surface of the second projection region, with the second display interface being located on a second side corresponding to the second edge of the display unit.

22. The electronic device according to claim 21, wherein the body comprises a main body and an assistant body, and the electronic device further comprises a connecting unit; the main body and the assistant body are rotatably connected by the connecting unit, wherein, in a case that the main body and the assistant body are at a first relative position, the projection unit projects in the first projection mode; and in a case that the main body and the assistant body are at a second relative position differing from the first relative position, the projection unit projects in the second projection mode.

23. The electronic device according to claim 22, wherein the assistant body comprises:
a first light path changing unit, which changes a projective light path of the projection unit, to make the projection unit switch between the first projection mode and the second projection mode.

24. The electronic device according to claim 23, wherein, the body further comprises a third surface, the second surface intersects with the third surface, and the third surface is opposite to the first surface,
in a case that the body stands on a supporting surface via the third surface, the first light path changing unit is in a first status and the projection unit projects in the first projection mode; and
in a case that the body stands on the supporting surface via the second surface, the first light path changing unit is in a second status and the projection unit projects in the second projection mode.

25. The electronic device according to claim 21, further comprising:
a first light path changing unit which is arranged in the body and which alternatively changes a projective light path of the projection unit between the first projection mode and the second projection mode.

26. The electronic device according to claim 21, further comprising:
a controlling unit, arranged in the body and controls, based on a triggering condition, the projection unit to switch between the first projection mode and the second projection mode.

27. The electronic device according to claim 26, wherein the body further comprises a third surface, the second surface intersects with the third surface, the third surface is opposite to the first surface, and the electronic device further comprises:
a detection unit which detects whether the body stands on a supporting surface via the third surface or the second surface;
where the controlling unit switches the projection unit to project in the first projection mode based on the triggering condition that the body stands on the supporting surface via the third surface, or switch the projection unit to project in the second projection mode based on the triggering condition that the body stands on the supporting surface via the second surface.

28. The electronic device according to claim 21, further comprising:
a gesture detection unit, which detects whether there is a gesture input while the projection unit projects in one or more of the first projection mode and the second projection mode; and
a first processing unit, arranged in the body, which performs an operation corresponding to the gesture input in response to the gesture input.

29. The electronic device according to claim 28, wherein the first processing unit, in response to the gesture input, performs the operation corresponding to the gesture input for the content to be projected.

* * * * *